United States Patent [19]

Kimura

[11] Patent Number: 5,120,985
[45] Date of Patent: Jun. 9, 1992

[54] DATA REPRODUCING CIRCUIT FOR CORRECTING AMPLITUDE VARIATION AND PEAK SHIFT

[75] Inventor: Toshiki Kimura, Yokohama, Japan

[73] Assignee: Fujitsu Limited, Japan

[21] Appl. No.: 468,541

[22] Filed: Jan. 23, 1990

[30] Foreign Application Priority Data

| Jan. 31, 1989 | [JP] | Japan | 1-21309 |
| Jan. 31, 1989 | [JP] | Japan | 1-21312 |
| Jan. 31, 1989 | [JP] | Japan | 1-21313 |
| Jan. 31, 1989 | [JP] | Japan | 1-21314 |
| Jan. 31, 1989 | [JP] | Japan | 1-21315 |

[51] Int. Cl.⁵ .................. H03K 5/00; H03K 5/153
[52] U.S. Cl. .................. 307/261; 307/268; 307/358
[58] Field of Search ........... 307/350, 351, 354, 358, 307/264, 262, 362, 261, 268; 328/164; 360/65; 330/304, 141

[56] References Cited

U.S. PATENT DOCUMENTS

| 3,505,537 | 4/1970 | Giordano | 307/362 |
| 3,737,808 | 6/1973 | Srivastava | 333/28 R |
| 4,078,157 | 3/1978 | Lender et al. | 328/164 |
| 4,081,756 | 3/1978 | Price et al. | 307/351 |
| 4,081,756 | 0/1978 | Price et al. . . |  |
| 4,266,204 | 7/1981 | Jacoby | 333/28 R |
| 4,319,288 | 1/1982 | Lee | 360/46 |
| 4,595,882 | 6/1986 | Silagi et al. | 330/304 |
| 4,697,098 | 9/1987 | Cloke | 307/354 |
| 4,746,816 | 5/1988 | Olesen | 307/351 |
| 4,761,609 | 8/1988 | Dorman et al. | 307/351 |
| 4,771,188 | 9/1988 | Cheng et al. | 307/351 |
| 4,866,300 | 9/1989 | Bolk et al. | 307/358 |

FOREIGN PATENT DOCUMENTS 61-229205 11/1986 Japan .

Primary Examiner—Stanley D. Miller
Assistant Examiner—Toan Tran
Attorney, Agent, or Firm—Armstrong, Nikaido, Marmelstein, Kubovcik & Murray

[57] ABSTRACT

A data reproducing circuit for a memory system having a data sensing head includes a first equalizing circuit for correcting a shift of a position of a peak of a reproduction signal supplied from the data sensing head and for generating a first signal in which the shift of the position of the peak has been corrected, and a second equalizing circuit for correcting a variation in an amplitude of the reproduction signal supplied from the data sensing head and for generating a second signal in which the variation of the amplitude of the reproduction signal has been corrected. A peak position detecting circuit detects the position of the peak of the reproduction signal from the first signal supplied from the first equalizing circuit. An amplitude detecting circuit detects the amplitude of the reproduction signal from the second signal supplied from the second equalizing circuit. A gate circuit generates a pulsed reproduction signal from the peak position detected by the peak position detecting circuit and the amplitude detected by the amplitude detecting circuit.

19 Claims, 18 Drawing Sheets

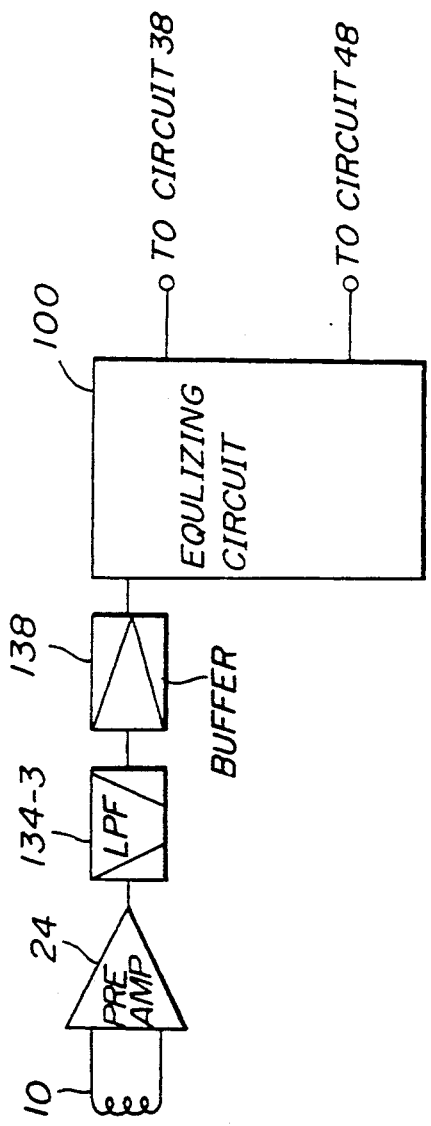
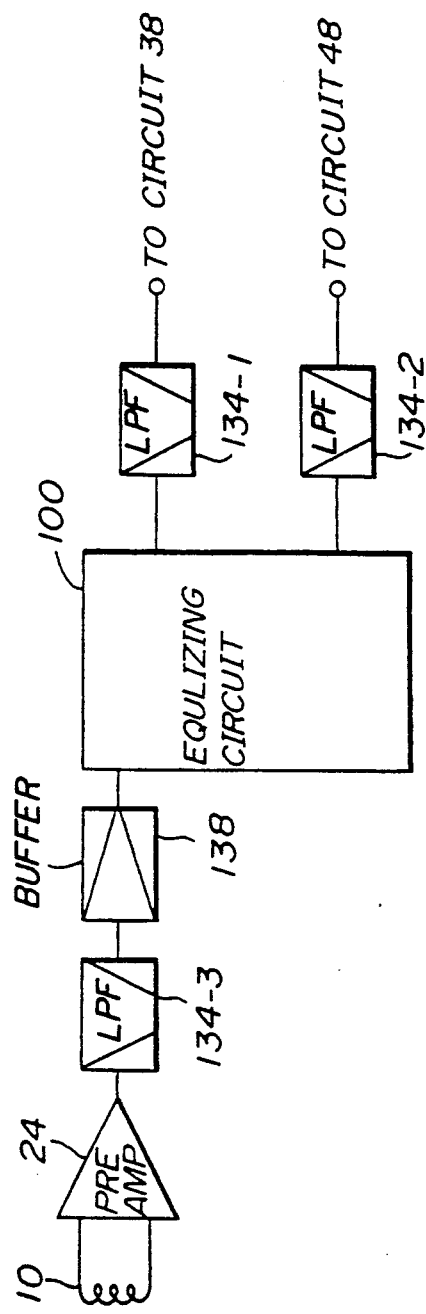
FIG.15A
FIG.15B

DATA REPRODUCING CIRCUIT FOR CORRECTING AMPLITUDE VARIATION AND PEAK SHIFT

BACKGROUND OF THE INVENTION

The present invention generally relates to a data reproducing circuit for a memory system having a reading head, such as a magnetic disk memory system, a magnetic tape memory system, an optical memory system, etc., and reproducing analog signals read out from the head as digital reproduction signals, with a high accuracy.

A conventional data reproducing circuit for a magnetic disc device is designed to detect the position of a peak of a reproduction signal from a magnetic disk through a data sensing head and an amplitude thereof exceeding a predetermined slice level and to generate, on the basis of the detected position of peak and the detected amplitude, a rectangular-wave read (reproduction) signal which represents the original or correct signal with high fidelity. As is well known, the peak position deviates from its original peak position due to a correlation between the peak position of interest and its adjacent peak positions (magnitude of the time interval). From this point of view, it is required to provide for an equalizing circuit which corrects a shift of the peak position (peak shift). Further, the amplitude of the reproduction signal varies due to a change of the reproduction frequency. Thus, it is required to provide for an equalizing circuit which corrects the amplitude variation. Moreover, the equalizing circuit directed to correcting a peak shift has an optimum value which is different from that for the equalizing circuit directed to correcting an the amplitude variation. For this reason, it is required to determine an optimum equalizing character, taking into consideration the difference between the optimum values of the two different equalizing circuits.

Referring to FIG. 1, there is illustrated a conventional data reproducing circuit. The illustrated data reproducing circuit includes a data sensing head 10, which reads a recording medium (not shown) and generates a reproduction signal. A preamplifier 24 amplifies the reproduction signal from the head 10, and outputs an amplified reproduction signal. The amplified reproduction signal is pulled up to a power source voltage Vcc through a resistor 26, and is then supplied to a delay circuit 16-1 and an attenuator 18-1. An output from the delay circuit 16-1 is input to a non-inverting input terminal of a subtracter amplifier 20. An output from the attenuator 18-1 is input to an inverting input terminal of the subtracter amplifier 20, which subtracts the output supplied from the attenuator 18-1 from the output supplied from the delay amplifier 16-1, and outputs the result of this subtraction. The output from the subtracter amplifier 20 is pulled up to the power source voltage Vcc through a resistor 28, and is then input to a delay circuit 16-2 and an attenuator 18-2. An adder amplifier 22 adds an output from the delay circuit 16-2 and an output from the subtracter amplifier 18-2.

The illustrated data reproducing circuit has a first function of correcting a peak shift of the reproduction signal which occurs during reproduction and a second function of correcting an amplitude variation due to a change of the reproduction frequency. An optimum correction characteristic of the data reproducing circuit can be provided by adjusting the amount of attenuation in each of the attenuators 18-1 and 18-2.

As shown in FIG. 2, the reproduction signal supplied from the head 10 has negative edges 32 having amplitude components which have a polarity opposite to that of a main signal waveform 30 of the reproduction signal and which are located on both sides thereof. From this viewpoint, the attenuator 18-1 is adjusted so as to have a characteristic suitable for correcting the peak shift and amplitude variation of the main signal waveform 30, and the attenuator 18-2 is adjusted so as to have a characteristic suitable for correcting the peak shift and amplitude variation arising from the negative edges 32.

It is noted that generally the optimum values to be provided for the attenuators 18-1 and 18-2 for correcting the peak shift of the main signal waveform 30 are not equal to those to be provided for the attenuators 18-1 and 18-2 for correcting the amplitude variation thereof. For this reason, it is impossible to provide each of the attenuators 18-1 and 18-2 with an optimum value suitable for correcting both the peak shift and amplitude variation. For this reason, the data reproducing circuit shown in FIG. 1 cannot correct both the peak shift and the amplitude variation effectively and cannot reproduce the original signal with a high accuracy.

The above discussion holds true for another conventional data reproducing circuit as shown in FIG. 3, in which those parts which are the same as those shown in FIG. 1 are given the same reference numerals. The output from the preamplifier 24 is input to the delay circuit 16-1 and the attenuator 18-2. The output from the delay circuit 16-1 is input to the delay circuit 16-2 and the attenuator 18-1. The output from the delay circuit 16-2 is applied to a first non-inverting input terminal of an adder/subtracter amplifier 20'. The outputs from the attenuators 18-1 and 18-2 are applied to an inverting input terminal and and a second non-inverting input terminal of the adder/subtracter amplifier 20', respectively. The adder/subtracter amplifier 20' subtracts the output supplied from the delay circuit 16-2 from the output supplied from the attenuator 18-1, and adds the output from the attenuator 18-2 to the result of subtraction.

The arrangement shown in FIG. 3 has the same problem as the arrangement shown in FIG. 1. That is, the optimum values to be provided for the attenuators 18-1 and 18-2 for correcting the peak shift of the main signal waveform 30 are not equal to those to be provided for the attenuators 18-1 and 18-2 for correcting the amplitude variation. Thus, it is impossible to provide each of the attenuators 18-1 and 18-2 with an optimum value suitable for correcting both the peak shift and amplitude variation. For this reason, the data reproducing circuit shown in FIG. 3 cannot correct both the peak shift and the amplitude variation effectively and cannot reproduce the original signal with a high accuracy.

SUMMARY OF THE INVENTION

It is a general object of the present invention to provide an improved data reproducing circuit for a memory system in which the aforementioned disadvantages are eliminated.

A more specific object of the present invention is to provide a data reproducing circuit for a memory system capable of effectively correcting both the peak shift and amplitude variation.

The above objects of the present invention are achieved a data reproducing circuit for a memory system having a data sensing head, comprising first equalizing device for correcting a shift of a position of a peak of a reproduction signal supplied from the data sensing head and for generating a first signal in which the shift of the position of the peak has been corrected; second equalizing device for correcting a variation in an amplitude of the reproduction signal supplied from the which the variation of the amplitude of the reproduction signal has been corrected; peak position detecting device, coupled to the first equalizing device, for detecting the position of the peak of the reproduction signal from the first signal supplied from the first equalizing device; amplitude detecting device, coupled to the second equalizing device, for detecting the amplitude of the reproduction signal from the second signal supplied from the second equalizing device; and gate device, coupled to the peak position detecting circuit and the amplitude detecting device, for generating a pulsed reproduction signal from the peak position detected by the peak position detecting circuit and the amplitude detected by the amplitude detecting device.

The above-mentioned objects of the present invention are also achieved by a data reproducing circuit for a memory system having a data sensing head, comprising an equalizing device for correcting a shift of a position of a peak of a reproduction signal supplied from the data sensing head and generating a first signal in which the shift of the position of the peak has been corrected and for correcting a variation in an amplitude of the reproduction signal supplied from the data sensing head and generating a second signal in which the variation of the amplitude of the reproduction signal has been corrected; peak position detecting device, coupled to the equalizing device, for detecting the position of the peak of the reproduction signal from the first signal supplied from the equalizing device; amplitude detecting device, coupled to the equalizing device, for detecting the amplitude of the reproduction signal from the second signal supplied from the equalizing device; and gate device, coupled to the peak position detecting circuit and the amplitude detecting device, for generating a pulsed reproduction signal from the peak position detected by the peak position detecting circuit and the amplitude detected by the amplitude detecting device.

Additional objects, features and advantages of the present invention will become apparent from the following detailed description when read in conjunction with the accompanying drawings.

BRIEF DESCRIPTION OF THE DRAWINGS data reproducing circuit for a memory system;

FIGS. 15A and 15B are block diagrams of variations of the fifth embodiment of the present invention shown in FIG. 14;

DESCRIPTION OF THE PREFERRED EMBODIMENTS

Figure 4:
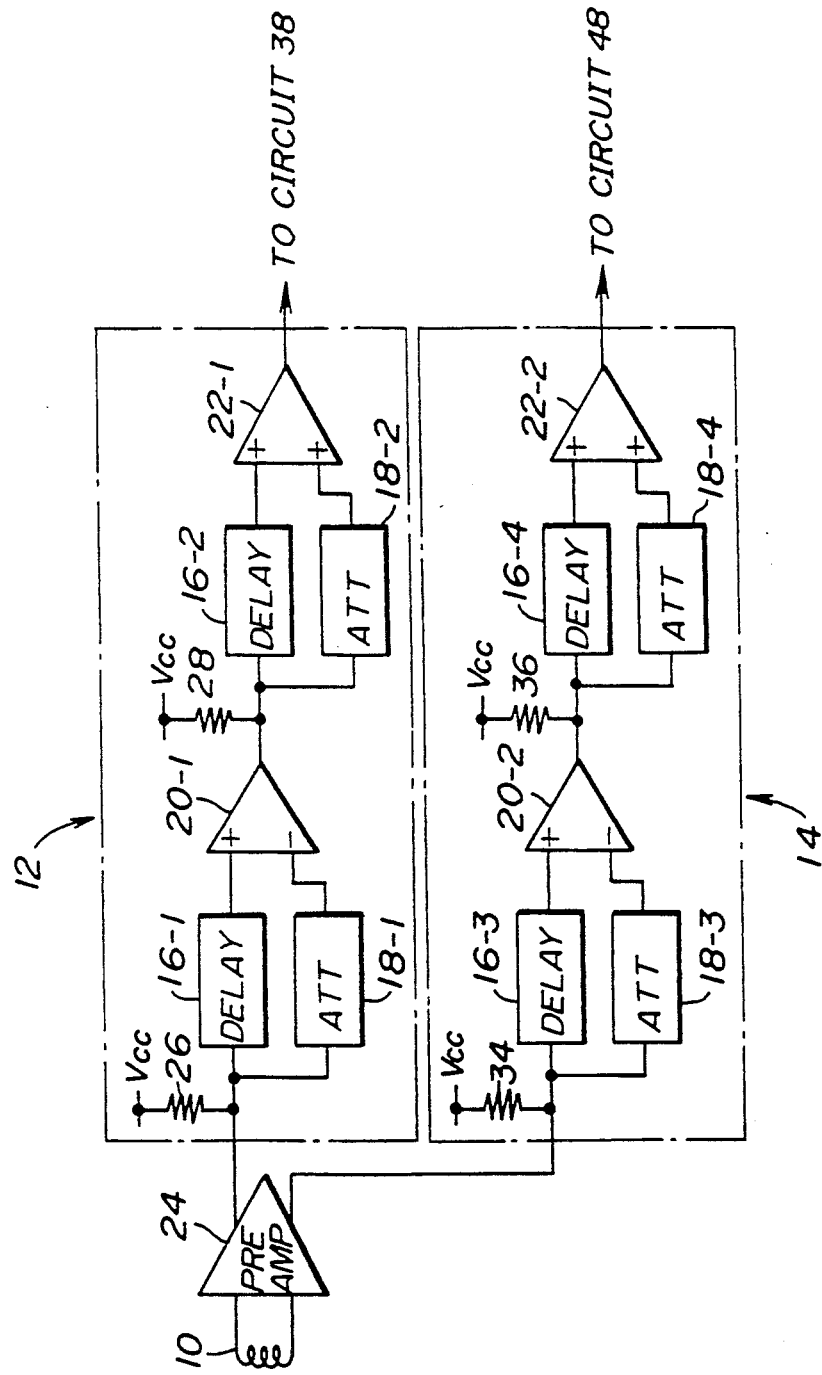
FIG. 4 is a block diagram of a first preferred embodiment of the present invention.

A description is given of a first preferred embodiment of the present invention with reference to FIG. 4, in which those parts which are the same as those shown in the previous figures are given the same reference numerals.

Figure 1:
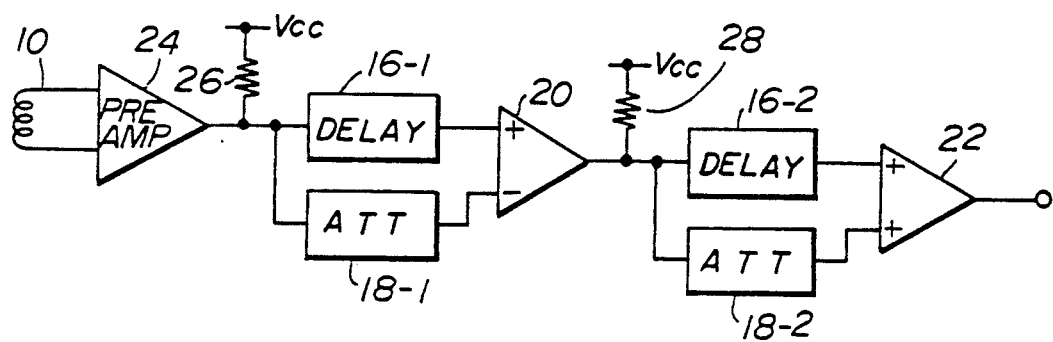

The data reproducing circuit according to the first embodiment of the present invention includes a first equalizing circuit 12 and a second equalizing circuit 14. The first equalizing circuit 12 corrects a peak shift of the reproduction signal supplied from the preamplifier 24. The second equalizing circuit 14 corrects an amplitude variation in the reproduction signal supplied from the preamplifier 24. The first equalizing circuit 12 is made up of two delay circuits 16-1 and 16-2, two attenuators 18-1 and 18-2, two subtracter amplifiers 20-1 and 22-1, and two pull-up resistors 26 and 28. The connection arrangement of these structural parts of the first equalizing circuit 12 is the same as that of the structural parts of the conventional configuration shown in FIG. 1. Similarly, the second equalizing circuit 14 is made up of two delay circuits 16-3 and 16-4, two attenuators 18-3 and 18-4, two subtracter amplifiers 20-2 and 22-2, and two pull-up resistors 34 and 36. The arrangement of these structural parts of the second equalizing circuit 14 is the same as that of those of the first equalizing circuit 12. The optimum values to be provided for the attenuators 18-1 and 18-2 are directed to correcting the peak shift of the reproduction signal. The optimum values to be provided for the attenuators 18-3 and 18-4 are directed to correcting the amplitude variation of the reproduction signal.

According to the first embodiment of the present invention, the peak shift is corrected by the attenuators 18-1 and 18-2, which are provided separately from the attenuators 18-3 and 18-4 directed to correcting the amplitude variation. By this arrangement, it becomes possible to effectively correct both the peak shift and amplitude variation and to reproduce the original signal with a high accuracy and reliability.

Figure 5:
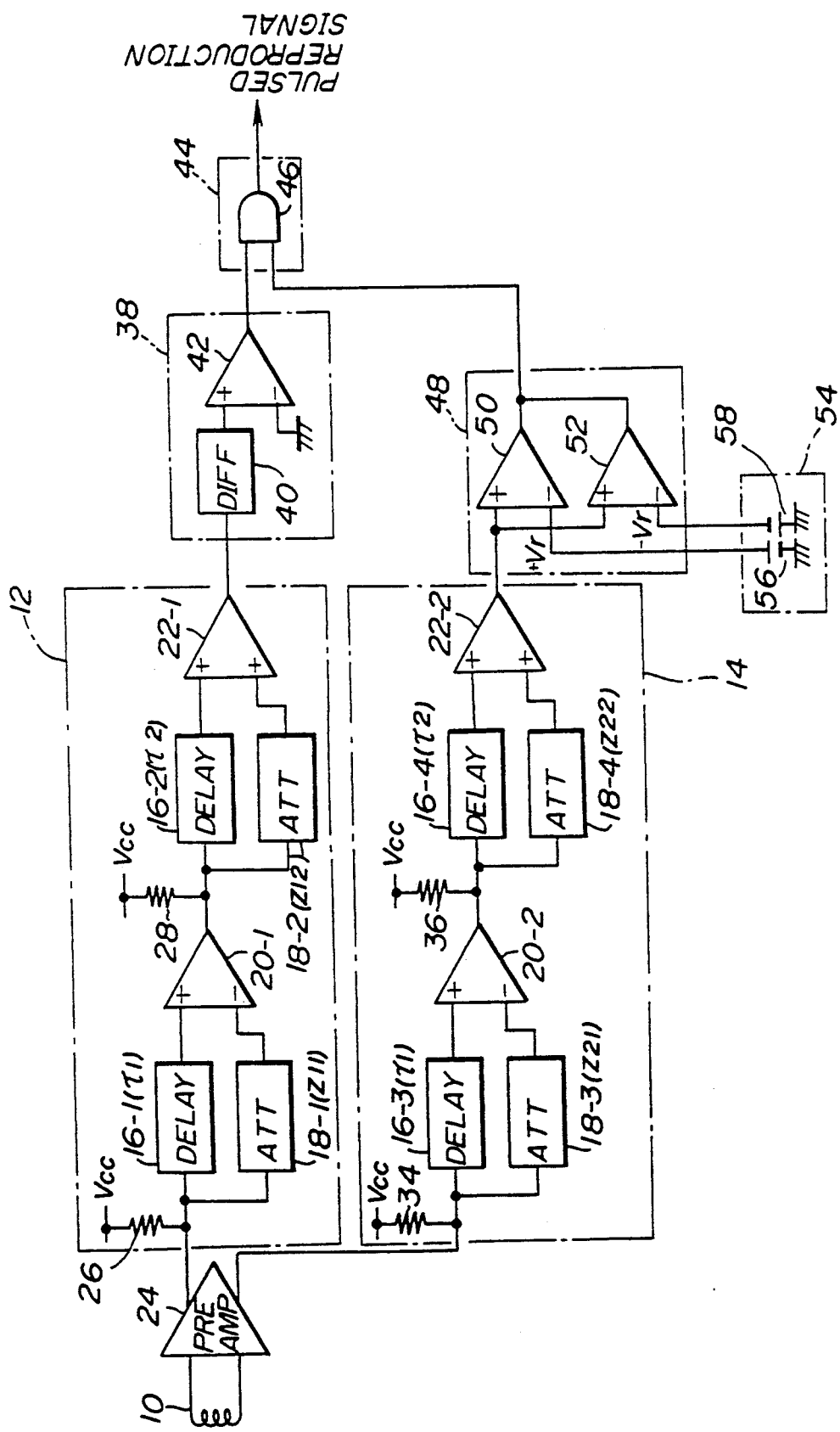
FIG. 5 is a block diagram illustrating a more detailed configuration of the first embodiment of the present invention shown in FIG. 4.

A description is given of a detailed configuration of the aforementioned data reproducing circuit according to the first embodiment of the present invention with reference to FIG. 5, in which those parts which are the same as those shown in FIG. 4 are given the same reference numerals. Referring to FIG. 5, the head 10 reads information (data) recorded on a recording medium (not shown) such as a magnetic disk, and generates a weak reproduction signal. The preamplifier 24 amplifiers the reproduction signal supplied from the head 10, and outputs two reproduction signals, which are respectively supplied to the first and second equalizing circuits 12 and 14. As described previously, the first equalizing circuit 12 corrects the peak shift of the reproduction signal, and the second equalizing signal 14 corrects the amplitude variation therein.

One of the output terminals of the preamplifier 24 is pulled up to the power source voltage Vcc through the resistor 26 of the first equalizing circuit 12. The pulled-up reproduction signal is input to the delay circuit 16-1 having a delay time $\tau_1$ and the attenuator 18-1 having an attenuation amount Z11. The output from the delay circuit 16-1 is applied to the non-inverting input terminal of the subtracter amplifier 20-1. The output from the attenuator 18-1 is applied to the inverting input terminal of the subtracter amplifier 20-1, which outputs a signal obtained by subtracting the output supplied from the attenuator 18-1 from the output supplied from the delay circuit 16-1.

The input impedance of the subtracter amplifier 20-1 is very high. Thus, the reproduction signal output from the delay circuit 16-1 is reflected at the non-inverting input terminal of the subtracter amplifier 20-1 and then returns to the input side through the delay circuit 16-1. As a result of the reflection, the attenuator 18-1 is supplied with a resultant signal obtained by adding the reproduction signal from the preamplifier 24 and a reflection signal from the delay circuit 16-1, which has been delayed by $2\tau_1$.

The output terminal of the subtracter amplifier 20-1 is pulled up to the power source voltage Vcc through the resistor 28. The output from the subtracter amplifier 20-1 is input to the delay circuit 16-2 having a delay time $\tau_2$ and the attenuator 18-2 having an attenuation amount Z12. The outputs from the delay circuits 16-2 and the attenuator 18-2 are added by the adder amplifier 22-1. The input impedance of the adder amplifier 22-1 is very high as in the case of the subtracter amplifier 20-1. Thus, the signal from the delay circuit 16-2 is reflected at the non-inverting input terminal of the adder amplifier 22-1 and returns to the input side through the delay circuit 16-2. As a result of the reflection, the attenuator 18-2 is supplied with a resultant signal obtained by adding the signal from the subtracter amplifier 22-1 and a reflection signal from the delay circuit 16-2, which has been delayed by $2\tau_2$.

Figure 2:
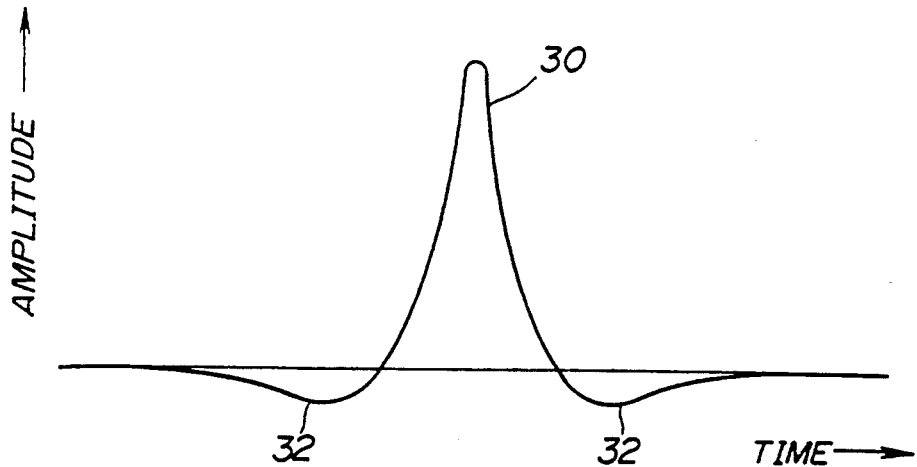
FIG. 2 is a waveform diagram illustrating a problem of the data reproducing circuit shown in FIG. 1.

The attenuation amount Z11 of the attenuator 18-1 of the first equalizing circuit 12 is adjusted so as to effectively correct the peak shift of the main signal waveform 30 of the reproduction signal (FIG. 2). The attenuation amount Z12 of the attenuator 18-2 of the first equalizing circuit 14 is adjusted so as to effectively correct the peak shift because of the presence of the negative edges 32 (FIG. 2) occurring on both sides of the main signal waveform 30.

The connection between the structural parts of the second equalizing circuit 14 is the same as that in the first equalizing circuit 12. That is, the associated output terminal of the preamplifier 24 is pulled up to the power source voltage Vcc through the resistor 34. The pulled-up reproduction signal is input to the delay circuit 16-3 having the delay time $\tau_1$ and the attenuator 18-3 having an attenuation amount Z21. The attenuator 18-3 corrects the amplitude variation in the main signal waveform 30 (FIG. 2). The outputs from the delay circuit 16-3 and the attenuator 18-3 are applied to the non-inverting and inverting input terminals of the subtracter amplifier 20-2 having the output terminal which is pulled up to the power source voltage Vcc through the resistor 36. The output circuit 16-4 having the delay time $\tau_2$ and the attenuator 18-4 having an attenuation amount Z22, which is adjusted to effectively correct the amplitude variation due to the presence of the negative edges 32 (FIG. 2).

An output from the first equalizing circuit 12 is supplied to a peak position detecting circuit 38, which is made up of a differentiator 40 and a zero-cross comparator 42. The differentiator 40 differentiates the reproduction signal supplied from the first equalizing circuit 12, and generates a differentiated signal which has a zero-cross point at a peak position of the reproduction signal. The zero-cross point of the differentiated signal is detected by the zero-cross comparator 42, which generates a peak position detection signal which rises to a high level at the peak position indicated by the zero-cross point.

On the other hand, an output from the second equalizing circuit 14 is supplied to an amplitude detecting circuit 48, which includes a window comparator composed of comparators 50 and 52. An inverting input terminal of the comparator 50 is supplied with a reference voltage $+Vr$ generated by a reference voltage source 56 of a reference voltage generating circuit 54. An inverting input terminal of the comparator 52 is supplied with a reference voltage $-Vr$ generated by a reference voltage source 58 of the reference voltage generating circuit 54. The window comparator composed of the comparators 50 and 52 generates a high-level output when the reproduction signal is equal to or greater than the reference voltage $+Vr$, and similarly generates a high-level output when the reproduction signal is equal to or less than the reference voltage $-Vr$.

The outputs from the peak position detecting circuit 38 and the amplitude detecting circuit 48 are supplied to a gate circuit 44, which includes an AND gate 46. The AND gate 46 performs a logic AND operation on the peak position detection signal and the amplitude detection signal, and generates a rectangular-wave read signal corresponding to the reproduction signal in which the peak shifts and amplitude variations have been corrected.

The attenuation amounts Z11 and Z21 of the attenuators 18-1 and 18-2 of the first equalizing circuit 12 are determined so that the time interval between adjacent rising portions of the output signal from the zero-cross comparator 42 of the peak detecting circuit 38 is equal to a predetermined value. The attenuation amounts Z21 and Z22 of the attenuators 18-3 and 18-4 of the second equalizing circuit 14 are determined so that the amplitude of a maximum frequency (fmax) component of the readout signal from the head 10 is equal to the amplitude of a minimum frequency (fmin) component thereof at the output terminal of the adder amplifier 22-2.

Figure 6:
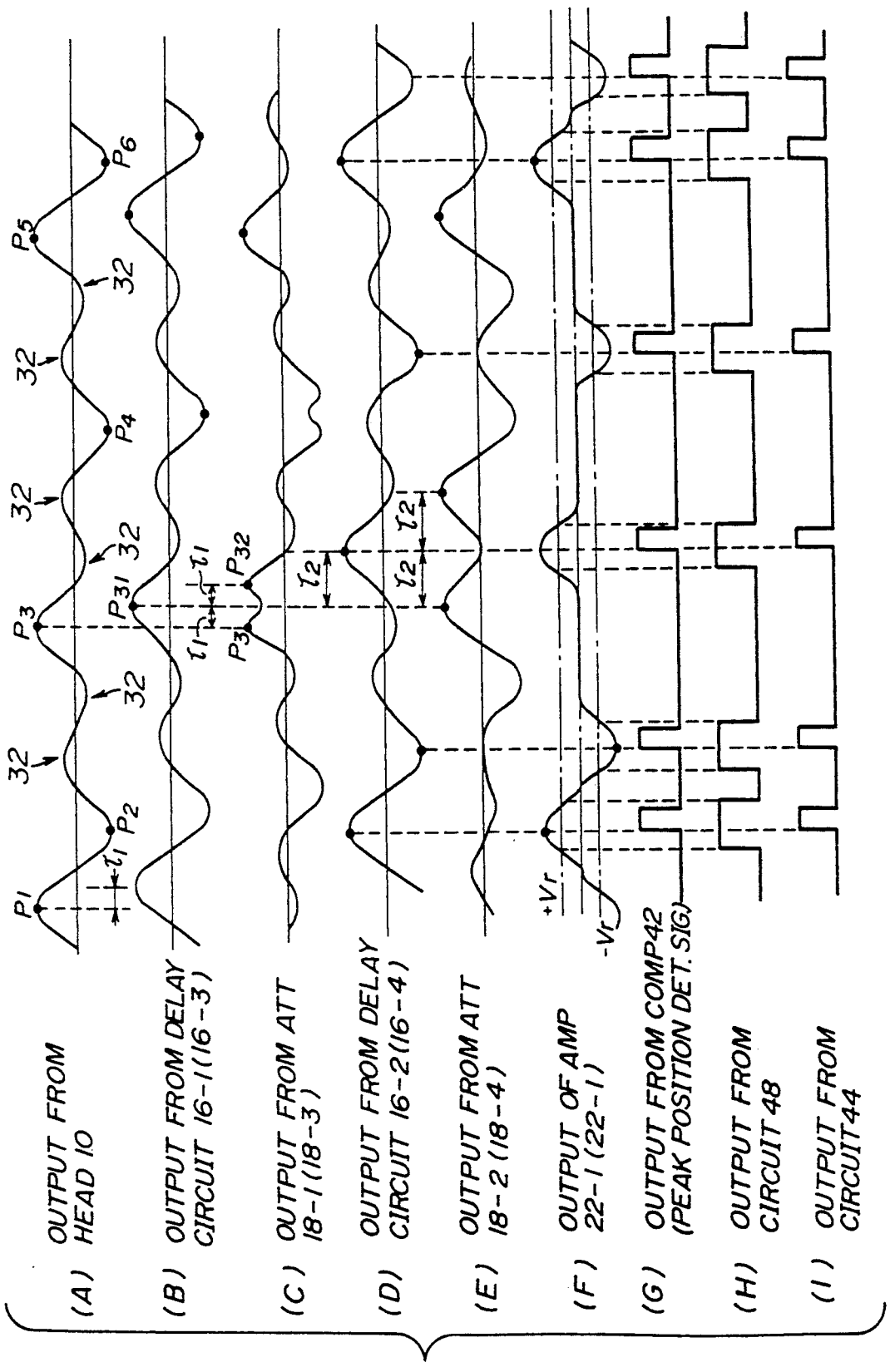
FIG. 6 is a waveform diagram of signals observed at different portions of the configuration shown in FIG. 5.

A description is given of the operation of the configuration shown in FIG. 5 with reference to FIG. 6. It is now assumed that the readout signal from the head 10 has a waveform shown in FIG. 6(A). The readout or reproduction signal has peak positions P1–P6. Negative edges occur on the back side of the peak position P2, on the front and back sides of the peak position P3, on the front and back sides of the peak position P4, and on the front side of the peak position P5. The reproduction signal shown in FIG. 6(A) is input to the first and second equalizing circuits 12 and 14.

For the same of simplicity, the following description relates to a case where the attenuation amounts Z11 and Z21 of the attenuators 18-1 and 18-3 are equal to each other, and the attenuation amounts Z12 and Z22 of the attenuators 18-2 and 18-4 are equal to each other. Thus, the same circuit portions of the first and second equalizing circuits 12 and 14 have the same signal waveforms.

The reproduction signal from the preamplifier 24 is delayed by the delay time $\tau_1$ by the delay circuit 16-1, which generates the output signal having a signal waveform shown in FIG. 6(B). At the same time, the reproduction signal from the preamplifier 24 is input to the attenuator 18-1. As described previously, the input impedance of the subtracter amplifier 20-1 is very high, and thus the reproduction signal from the delay circuit 16-1 is reflected at the non-inverting input terminal of the subtracter amplifier 20-1, and then returns to the input of the delay circuit 16-1. As a result, the attenuator 18-1 is supplied with the reflection signal having the delay time equal to $2\tau_1$ in addition to the reproduction signal from the preamplifier 24. Thus, the attenuator 18-1 outputs the signal having a waveform shown in FIG. 6(C). The signal waveform at the peak position P3 having the negative edges on the front and back sides thereof (FIG. 6(A)) is delayed by the delay time $\tau_1$ by the delay circuit 16-1 so that it outputs a signal waveform having a peak position P31 (FIG. 6(B)). As shown in FIG. 6(C), the output from the attenuator 18-1 has a waveform having two successive peak positions P3 and P32. The peak position P32 lags behind the peak position P3 by the delay time equal to $2\tau_1$. The output from the delay circuit 16-1 is subtracted from the output from the attenuator 18-1 by the subtracter amplifier 20-1 and the resultant output is applied to the delay circuit 16-2 and the attenuator 18-2.

The output from the delay circuit 16-2 has a signal waveform shown in FIG. 6(D), which is obtained by delaying the output signal from the subtracter amplifier 20-1 by a delay time of $\tau_2$. The output from the attenuator 18-2 has a waveform as shown in FIG. 6(E), which is obtained by adding the reflection signal from the delay circuit 16-2 to the output signal of the subtracter amplifier 20-1. The output from the adder amplifier 22-1 has a waveform shown in FIG. 6(F), which is obtained by adding the outputs from the delay circuit 16-2 and the attenuator 18-2. It can be seen from FIG. 6(F) that the peak shifts are corrected and the negative edges are eliminated.

The output from the first equalizing circuit 12, that is, the output from the adder amplifier 22-1 shown in FIG. 6(E) is supplied to the peak position detecting circuit 38. The differentiator 40 of the peak position detecting circuit 38 differentiates the output from the adder amplifier 22-1 and thereby generates the differentiated signal which has a zero-cross point at each peak position. The differentiated signal is supplied to the zero-cross comparator 42, which outputs the peak position detection signal having a waveform shown in FIG. 6(G). The peak position detection signal has pulses, each of which rises to the high level at a peak position and has the predetermined pulse width.

As described previously, for the sake of simplicity, the attenuation amount Z21 provided by the attenuator 18-3 is set equal to the attenuation amount Z11 provided by the attenuator 18-1, and the attenuation amount Z22 provided by the attenuator 18-4 is set equal to the attenuation amount Z12 provided by the attenuator 18-2. Thus, the output from the delay circuit 16-3 is as shown in FIG. 6(B), and the output from the subtracter attenuator 18-3 is as shown in FIG. 6(C) as in the case of the first equalizing circuit 12. Similarly, the output from the delay circuit 16-4 is as shown in FIG. 6(D), the output from the subtracter attenuator 18-4 is as shown in FIG. 6(E), and the output from the adder amplifier 22-2 is as shown in FIG. 6(F).

The output from the second equalizing circuit 14, that is, the output from the adder amplifier 22-2 is supplied to the amplitude detecting circuit 48. The comparators 50 and 52 are provided with the reference voltages $\pm Vr$ as shown in FIG. 6(F). The amplitude detecting circuit 48 outputs the amplitude detection signal (pulse) shown in FIG. 6(H) when the output from the adder amplifier 22-2 is equal to or greater than the reference voltage $+Vr$, or equal to or less than the reference voltage $-Vr$. The outputs from the peak position detecting circuit 38 and the amplitude detecting circuit 48 are supplied to the AND gate 46 of the gate circuit 44, which generates the output signal shown in FIG. 6(I).

Figure 3:
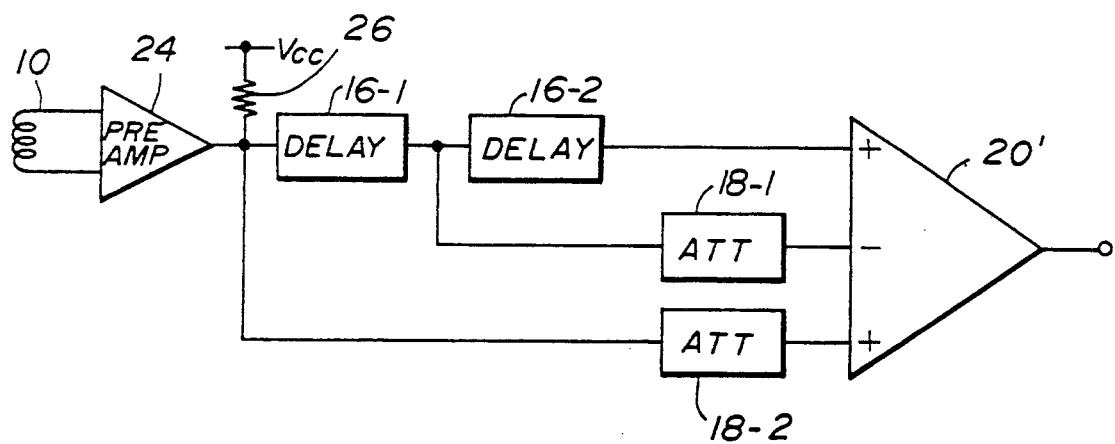
FIG. 3 is a block diagram of another conventional data reproducing circuit for a memory system.
Figure 7:
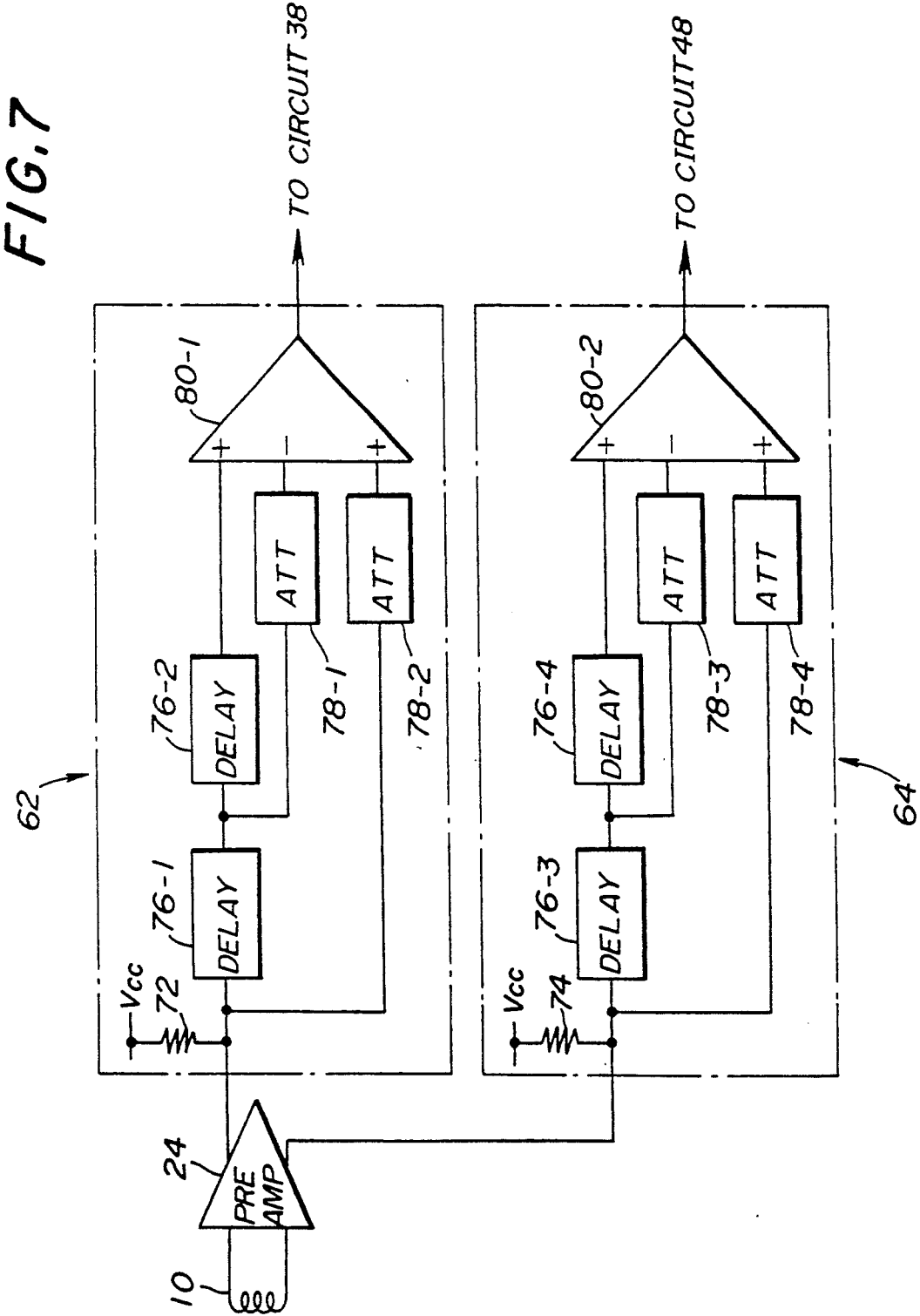
FIG. 7 is a block diagram of a second preferred embodiment of the present invention.

A description is given of the data reproducing circuit according to a second preferred embodiment of the present invention with reference to FIG. 7. The data reproducing circuit shown in FIG. 7 is composed of a first equalizing circuit 62 and a second equalizing circuit 64. The first equalizing circuit 62 corrects the peak shift, and the second equalizing circuit 64 corrects the amplitude variation. The first equalizing circuit 62 is made up of a pull-up resistor 72, two delay circuits 76-1 and 76-2, two attenuators 78-1 and 78-2 and an adder/subtracter amplifier 80-1. The arrangement of these structural parts of the first equalizing circuit 62 is the same as that of those of the circuit shown in FIG. 3. The second equalizing circuit 64 is formed in the same manner as the first equalizing circuit 62, and is made up of a pull-up resistor 74, two delay circuits 76-3 and 76-4, two attenuators 78-3 and 78-4 and an adder/subtracter amplifier 80-2. The optimum values for correcting the peak shift are provided for the attenuators 78-1 and 78-2, and the optimum values for correcting the amplitude variation are provided for the attenuators 78-3 and 78-4.

According to the second embodiment of the present invention, the first equalizing circuit 62 for correcting the peak shift is provided separately from the second equalizing circuit 64 for correcting the amplitude variation. Thus, it is possible to independently correct the peak shift and amplitude variation with a high accuracy and high reliability.

Figure 8:
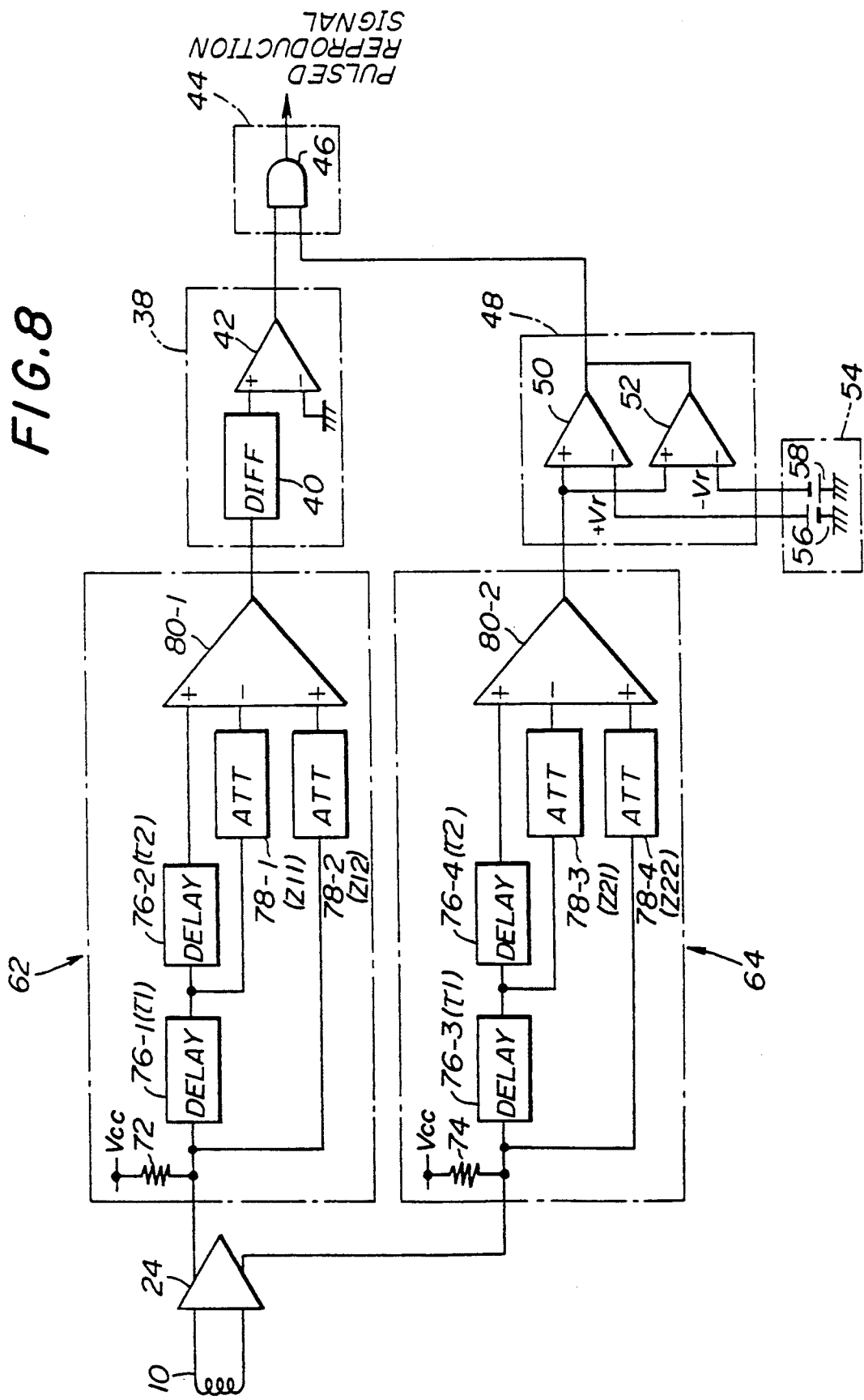
FIG. 8 is a block diagram illustrating a more detailed configuration of the second embodiment of the present invention shown in FIG. 7.

FIG. 8 is a block diagram illustrating the details of the configuration shown in FIG. 7. In FIG. 8, those parts which are the same as those shown in the previous figures are given the same reference numerals. One of the reproduction signals from the preamplifier 24 is supplied to the first equalizing circuit 62 arranged to correct the peak shift, and the other reproduction signal is supplied to the second equalizing circuit 64 arranged to correct the amplitude variation.

The output terminal of the preamplifier 24 associated with the first equalizing circuit 62 is pulled up to the power source voltage Vcc through the resistor 72. The delay circuit 76-1 has a delay time $\tau_1$, and the delay circuit 76-2 connected to the delay circuit 76-1 in series has a delay time $\tau_2$. An output from the delay circuit 76-2 is applied to a first non-inverting input terminal of the adder/subtracter amplifier 80-1. An output from the attenuator 78-1 is supplied to an inverting input terminal of the adder/subtracter amplifier 80-1. An output from the attenuator 78-2 is applied to a second non-inverting input terminal of the adder/subtracter amplifier 80-1, which outputs a signal obtained by subtracting the output from the attenuator 78-1 from the output supplied from the delay circuit 76-2 and adding the output from the attenuator 78-2 to the result of this subtraction.

The input impedance of the adder/subtracter 80-1 is very high, and thus the outputs from the delay circuit 76-2 and the attenuator 78-2 are reflected at the corresponding non-inverting input terminals of the adder/subtracter amplifier 80-1. Thus, the attenuator 78-1 is supplied with the output from the delay circuit 76-1 having a delay of time equal to $\tau_1$ and a reflection signal passing through the delay circuit 76-2 having a delay of time equal to $\tau_1 + 2 \cdot \tau_2$. On the other hand, the attenuator 78-2 is supplied with the output from the preamplifier 24 and a reflection signal passing through the delay circuits 76-2 and 76-1 in this order having a delay of time equal to $2(\tau_1 + \tau_2)$. The attenuators 78-3 and 78-4 of the second equalizing circuit 64 are supplied with the signals in the same manner as the attenuators 78-1 and 78-2 of the first equalizing circuit 62. The attenuation amounts Z11, Z12, Z21 and Z22 of the attenuators 78-1, 78-2, 78-3 and 78-4 are determined in the same manner as those for the aforementioned first embodiment of the present invention.

The output from the first equalizing circuit 62 is input to the aforementioned peak position detecting circuit 38, and the output from the second equalizing circuit 64 is input to the aforementioned peak position detecting circuit 48.

Figure 9:
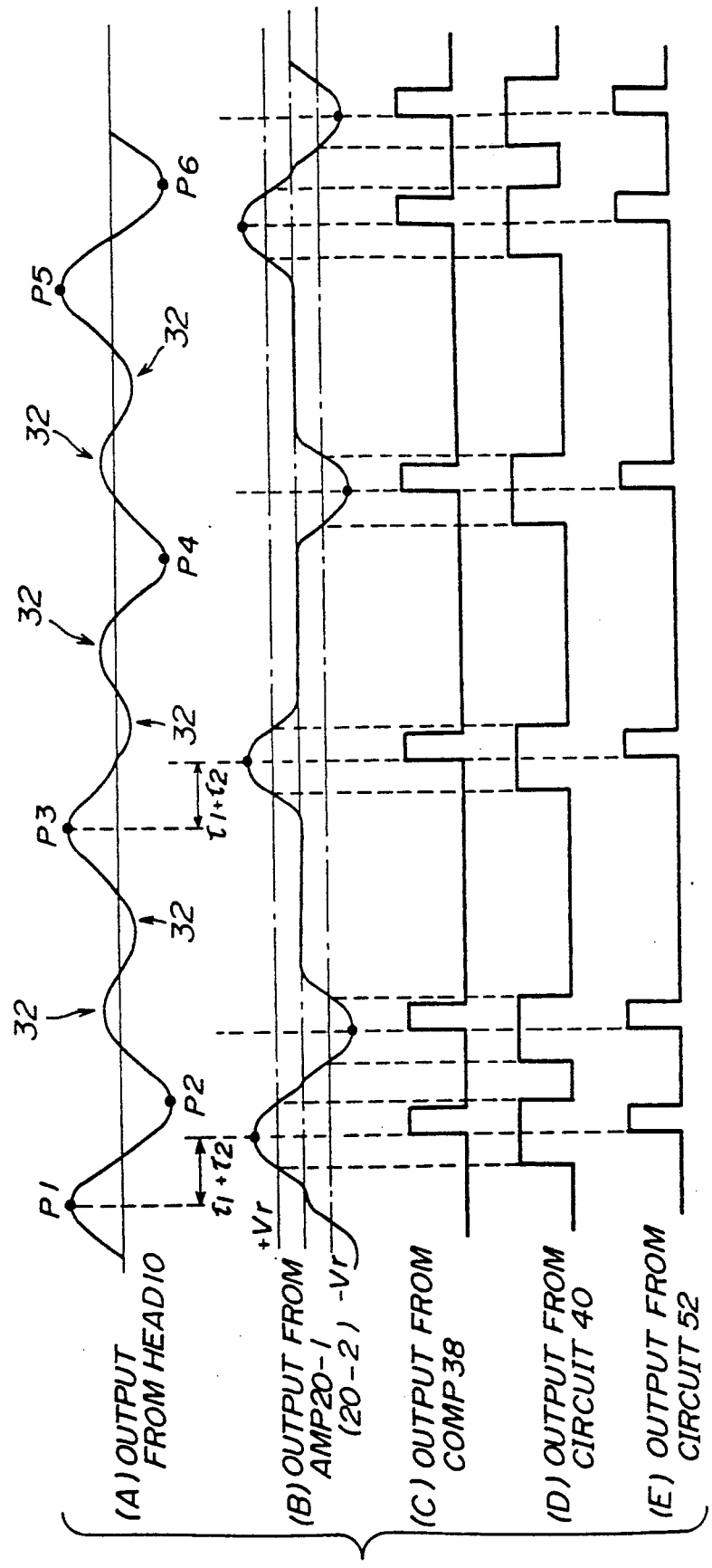
FIGS. 9 and 10 are waveform diagrams of signals observed at different portions of the configuration shown in FIG. 8.

A description is given of the operation of the configuration shown in FIG. 8 with reference to FIG. 9. It is now assumed that the readout signal from the head 10 has a waveform shown in FIG. 9(A). The readout or reproduction signal has peak positions P1-P6. Negative edges occur on the back side of the peak position P2, on the front and back sides of the peak position P3, on the front and back sides of the peak position P4, and on the front side of the peak position P5. The reproduction signal shown in FIG. 9(A) is input to the first and second equalizing circuits 62 and 64.

For the sake of simplicity, the following description relates to a case where the attenuation amounts Z11 and Z21 of the attenuators 78-1 and 78-3 are equal to each other, and the attenuation amounts Z12 and Z22 of the attenuators 78-2 and 78-4 are equal to each other. Thus, the same circuit portions of the first and second equalizing circuits 62 and 64 have the same signal waveforms. In addition to FIG. 9, the operation of the data reproducing circuit shown in FIG. 8 is explained with reference to FIG. 10 which shows waveforms of signals with respect to the isolated waveform at the peak position P3 shown in FIG. 9(A).

The reproduction signal from the preamplifier 24 is delayed by the delay time $\tau_1$ by the delay circuit 76-1, which generates the output signal having a signal waveform shown in FIG. 10(B). The output from the delay circuit 76-1 is delayed by the delay time $\tau_2$ through the delay circuit 76-2, which generates the output having a waveform shown in FIG. 10(C).

On the other hand, the attenuator 78-1 is supplied with a reflection signal passing through the delay circuit 76-2 and the output signal from the delay circuit 76-1, and generates the output signal having a signal waveform shown in FIG. 10(D). The attenuator 78-2 is supplied with the reproduction signal from the preamplifier 24 and a reflection signal having a delay of time of $2(\tau_1 + \tau_2)$, and generates the output having a signal waveform shown in FIG. 10(E). The adder/subtracter 80-1 receives the signals shown in FIG. 10(C), (D) and (E), and generates the output signal having a waveform shown in FIG. 10(F). The second equalizing circuit 64 operates in the same manner as the first equalizing circuit 62. The outputs from the first and second equalizing circuits 62 and 64 are input to the peak position detecting circuits 38 and the amplitude detecting circuit 48, respectively. It can be seen from FIG. 10(F) that the peak shift is effectively corrected and the negative edges 32 (FIG. 10(A)) are totally eliminated.

Figure 11:
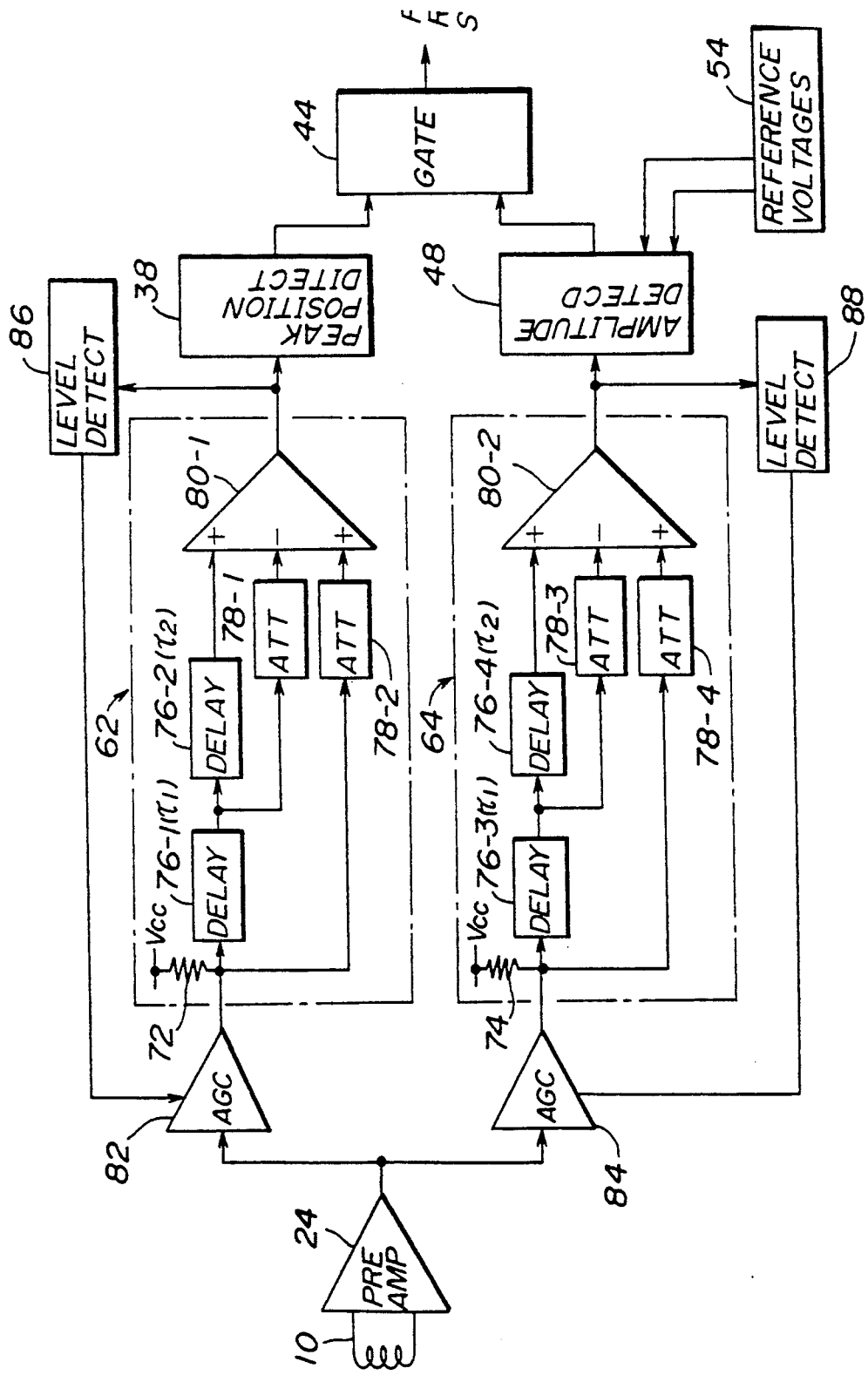
FIG. 11 is a block diagram of a third preferred embodiment of the present invention.

A description is given of a third embodiment of the aforementioned second embodiment of the present invention with reference to FIG. 11, in which those parts which are the same as those shown in the previous figures are given the same reference numerals. When the output from the first equalizing circuit 62 shown in FIGS. 7 and 8 is saturated, the peak position detecting circuit 38 may detects an incorrect peak position or detects no peak position. When the output from the second equalizing circuit 64 shown in FIGS. 7 and 8 is saturated or does not have a sufficient amplitude level, the amplitude detecting circuit 48 may continue to output the amplitude detection signal for an excessively long time or cannot detect the amplitude of the signal from the second equalizing circuit 64. Further, when the output from the second equalizing circuit 64 fluctuates, noise occurs. The configuration shown in FIG. 11 is directed to eliminating the above-mentioned problems.

Figure 10:
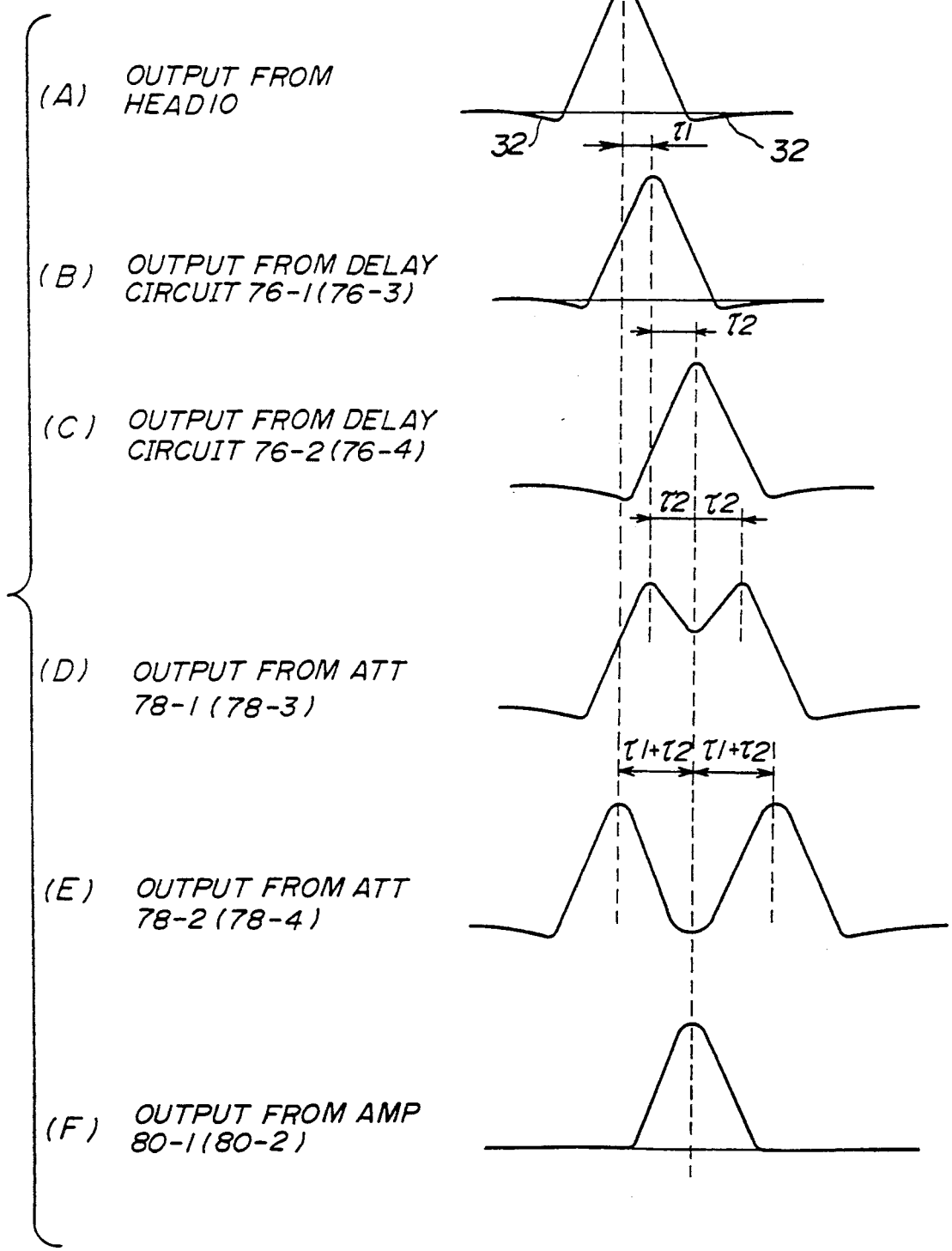

Referring to FIG. 11, two automatic gain control amplifiers (hereafter simply referred to as AGC amplifiers) 82 and 84 and level detection circuits 86 and 88 are added to the configuration shown in FIG. 8. The level detection circuit 86 detects the level of the output from the first equalizing circuit 62 and outputs a control signal based on the detected level. The AGC amplifier 82 regulates the output level of the first equalizing circuit 62 so as to be always equal to a constant level in accordance with the control signal from the level detection circuit 86. The level detection circuit 84 detects the level of the output from the second equalizing circuit 64 and outputs a control signal based on the detected level. The AGC amplifier 84 regulates the output level of the second equalizing circuit 64 so as to be always equal to a constant level in accordance with the control signal from the level detection circuit 88. Thereby, the first and second equalizing circuits 62 and 64 output the individual constant output levels independently of the characteristics of the head 10 or different levels of the signal from the head 10 at different positions of tracks on the recording medium. The data reproducing circuit shown in FIG. 11 operates as shown in FIGS. 9 and 10.

Figure 12:
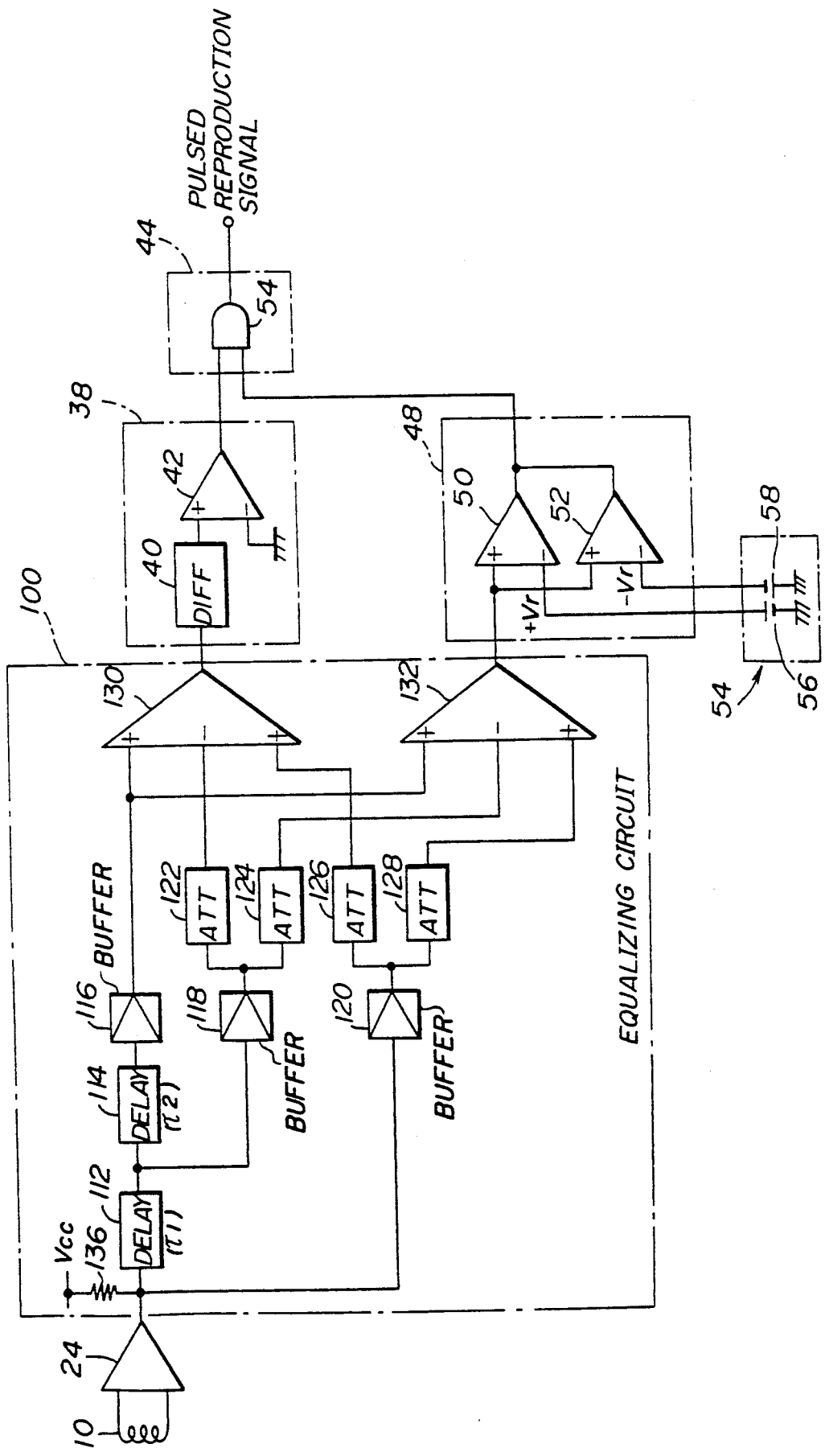
FIG. 12 is a block diagram of a fourth preferred embodiment of the present invention.

A description is given of a fourth embodiment of the present invention with reference to FIG. 12, in which those parts which are the same as those shown in the previous figures are given the same reference numerals. Each of the first and second embodiments of the present invention described previously employs four delay circuits such as the delay circuits 16-1, 16-2, 16-3 and 16-4

(FIG. 4). In this arrangement, it is difficult to adjust the delay circuits 16-1 and 16-3 so as to have the exactly the same delay amount. The presence of a difference in delay amount between the delay circuits 16-1 and 16-3 deteriorates the equalizing correction. Further, the use of the four delay circuits increases the manufacturing cost and prevents the circuit from being made compact. The data reproducing circuit according to the fourth embodiment of the present invention is intended to get rid of these problems.

Referring to FIG. 12, an equalizing circuit 100 is made up of two delay circuits 112 and 114, three buffer amplifiers 116, 118 and 120, four attenuators 130 and 132 and a pull-up resistor 136. The delay circuits 112 and 114 have delay times $\tau_1$ and $\tau_2$, respectively, and are connected in series. The pull-up resistor 136 is connected to the input terminal of the delay circuit 112. The reproduction signal supplied from the preamplifier 24 is input to the buffer amplifier 120, which has a high impedance. An output from the delay circuit 112 is input to the buffer amplifier 118, which has a high impedance. An output from the delay circuit 114 is input to the buffer amplifier 116, which has a high impedance. An output from the buffer amplifier 118 is supplied to the attenuators 122 and 124. Similarly, an output from the buffer amplifier 120 is supplied to the attenuators 126 and 128.

The attenuator 122 is provided for correcting the peak shift, particularly the peak shift of the main signal waveform 30 of the reproduction signal (FIG. 2). The attenuator 124 is provided for correcting the amplitude variation, particularly the amplitude variation in the main signal waveform 30. The attenuator 126 is provided for correcting the peak shift, particularly the peak shift arising from the negative edges 32 contained in the reproduction signal (FIG. 2). The attenuator 128 is provided for correcting the amplitude variation, particularly the amplitude variation resulting from the negative edges 32.

The adder/subtracter amplifier 130 subtracts an output supplied from the attenuator 122 from an output supplied from the buffer amplifier 116 and adds an output from the attenuator 126 to the result of this subtraction. Then the adder/subtracter amplifier 130 outputs a reproduction signal which has been subjected to the peak shift equalizing correction. The adder/subtracter amplifier 130 subtracts an output supplied from the attenuator 124 from the output supplied from the buffer amplifier 116 and adds an output of the attenuator 128 to the subtraction result.

Then the adder/subtracter amplifier 132 outputs a reproduction signal which has been subjected to the amplitude variation equalizing correction. The outputs from the adder/subtracter amplifiers 130 and 132 are supplied to the peak position detecting circuit 38 and the amplitude detecting circuit 42, respectively. According to the fourth embodiment of the present invention, the two delay circuits 112 and 114 are used in common to the peak shift correction and amplitude variation correction. Thus, the delay characteristics of the peak shift correction and amplitude variation correction are exactly the same. Further, it is possible to make the data reproducing circuit compact.

Figure 13:
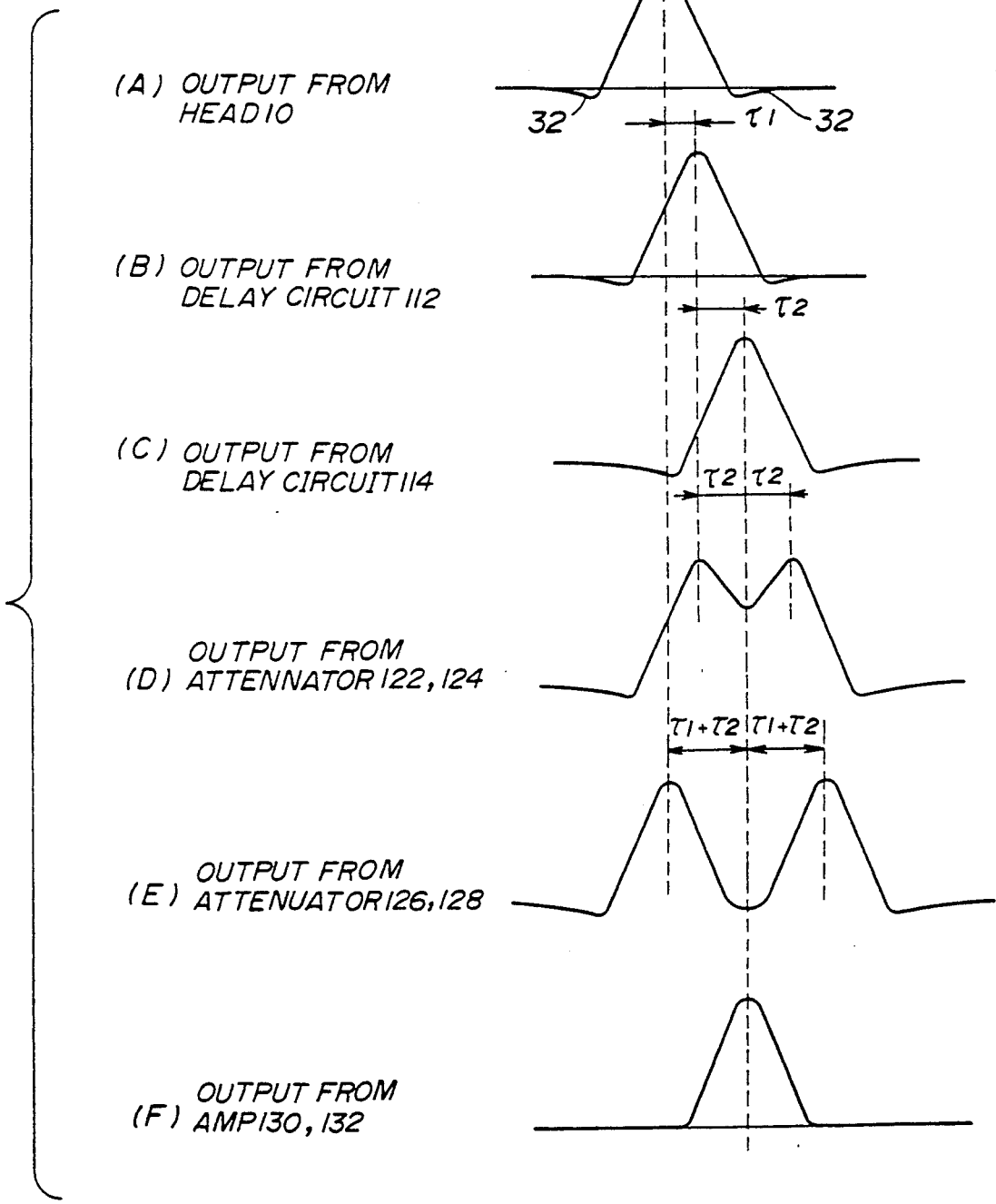
FIG. 13 is a waveform diagram of signals observed at different portions of the configuration shown in FIG. 12.

FIG. 13(A) illustrates a waveform of the signal from the head 10, which corresponds to that shown in FIG. 10(A). FIG. 13(B) illustrates a waveform of the output from the delay circuit 112, and FIG. 13(C) illustrates a waveform of the delay circuit 114. FIG. 13(D) illustrates a waveform of the output from each of the attenuators 122 and 124, and FIG. 13(E) illustrates a waveform of the signal from each of the the attenuators 126 and 128. FIG. 13(F) illustrates a waveform of the output from each of the adder/subtracter amplifiers 130 and 132.

A description is given of a fifth embodiment of the present invention. The fifth embodiment of the present invention corresponds to a modification of the aforementioned fourth embodiment of the present invention. In the configuration shown in FIG. 12, noise components which match with the frequency characteristics of the equalizing circuit 100 can be eliminated. However, noise components outside of the frequency range of the equalizing circuit 100 cannot be eliminated. The fifth embodiment of the present invention is intended to get rid of the above-mentioned problem.

Figure 14:
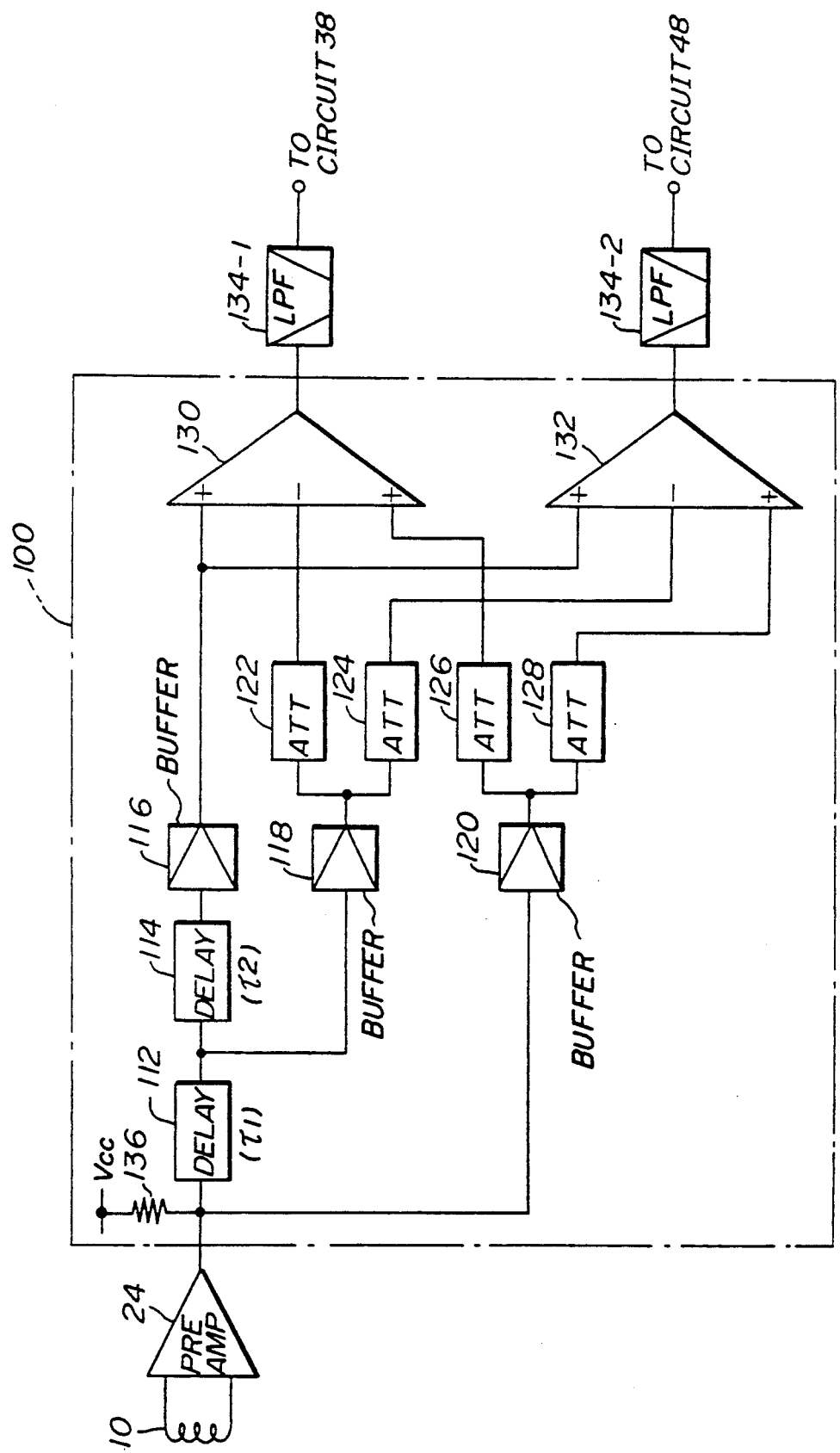
FIG. 14 is a block diagram of a fifth preferred embodiment of the present invention.

Referring to FIG. 14, there is illustrated a configuration of the fifth embodiment of the present invention. In FIG. 14, those parts which are the same as those shown in the previous figures are given the same reference numerals. A filter 134-1 is connected to the output terminal of the adder/subtracter amplifier 130, and a filter 134-2 is connected to the output terminal of the adder/subtracter amplifier 132. When the frequency range of the reproduction signal is between 2 MHz and 9 MHz, each of the filters 134-1 and 134-2 is formed by a lowpass filter having a cutoff frequency of about 10 MHz–11 MHz. The lowpass filters 134-1 and 134-2 each having such a cutoff frequency eliminate noise components having frequencies higher than the cutoff frequency from the output signals from the adder/subtracter amplifiers 130 and 132, respectively.

FIG. 15A is a block diagram of a variation of the fifth embodiment of the present invention. A filter 134-3 is provided instead of the filters 134-1 and 134-2 shown in FIG. 14. The filter 134=3 is connected to the output terminal of the preamplifier 24. A buffer amplifier 138 is provided for matching the output impedance of the filter 134-3 and the input impedance of the equalizing circuit 100. When the frequency range of the reproduction signal is between 2 MHz and 9 MHz, the filter 134-3 is formed by a lowpass filter having a cutoff frequency of about 10 MHz–11 MHz. The unnecessary signal components are eliminated from the reproduction signal before it is input to the equalizing circuit 100. Thus, the equalizing operation can be executed without being affected by the unnecessary signal components.

FIG. 15B is a block diagram of a variation of the fifth embodiment of the present invention, which corresponds to the combination of the configurations shown in FIG. 14 and FIG. 15A.

Figure 16:
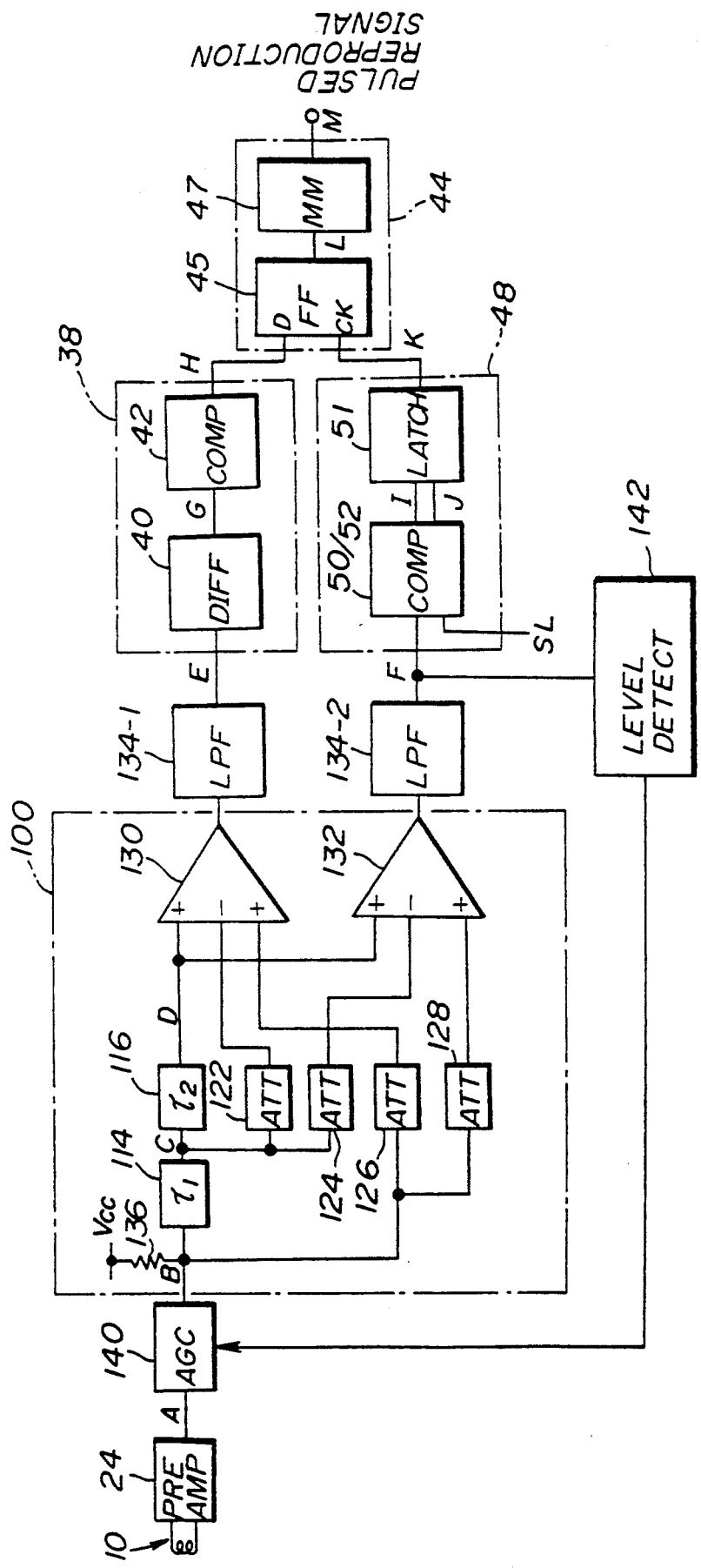
FIG. 16 is a block diagram of a sixth preferred embodiment of the present invention.

A description is given of a sixth embodiment of the present invention with reference to FIGS. 16, 17A, 17B and 18. FIG. 16 is a block diagram of the sixth embodiment of the present invention. In FIG. 16, those parts which are the same as those shown in the previous figures are given the same reference numerals. The reproduction signal from the preamplifier 24 is input to an AGC amplifier 140, which is controlled by a level detection circuit 142 which detects the level of the signal from the lowpass filter 134-2. It is noted that the configuration shown in FIG. 16 uses a single AGC amplifier, whereas the configuration shown in FIG. 11 uses the two AGC amplifiers 82 and 84. In practical use, it is sufficient to use a single AGC amplifier which is controlled by the level of the signal from the adder/subtracter amplifier 132. The equalizing circuit 100 is the same as that shown in FIG. 12 except that the buffer amplifiers 116, 118 and 120 shown in FIG. 12 is omitted in FIG. 16 for the sake of simplicity. The amplitude detecting circuit 48 includes the two comparators 50 and 52, and a latch circuit 51. The comparators 50 and 52 output the detection signals relating to the positive and negative amplitudes. The gate circuit 44 includes a D-type flip-flop 45 serving as the aforementioned AND gate 54, and a monostable multivibrator 47.

Figure 17A:
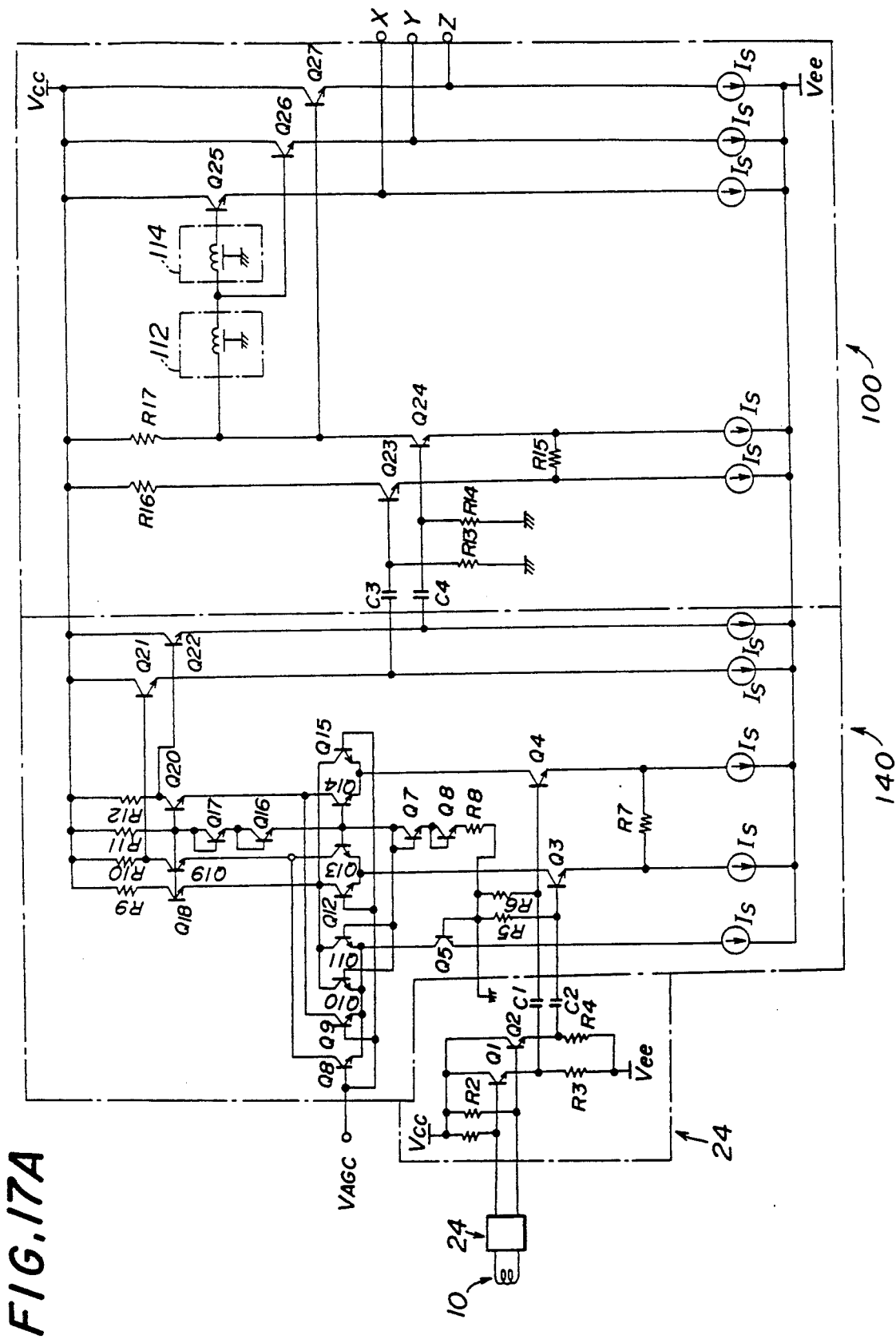
FIGS. 17A and 17B are circuit diagrams of the sixth embodiment of the present invention shown in FIG. 16.
Figure 17B:
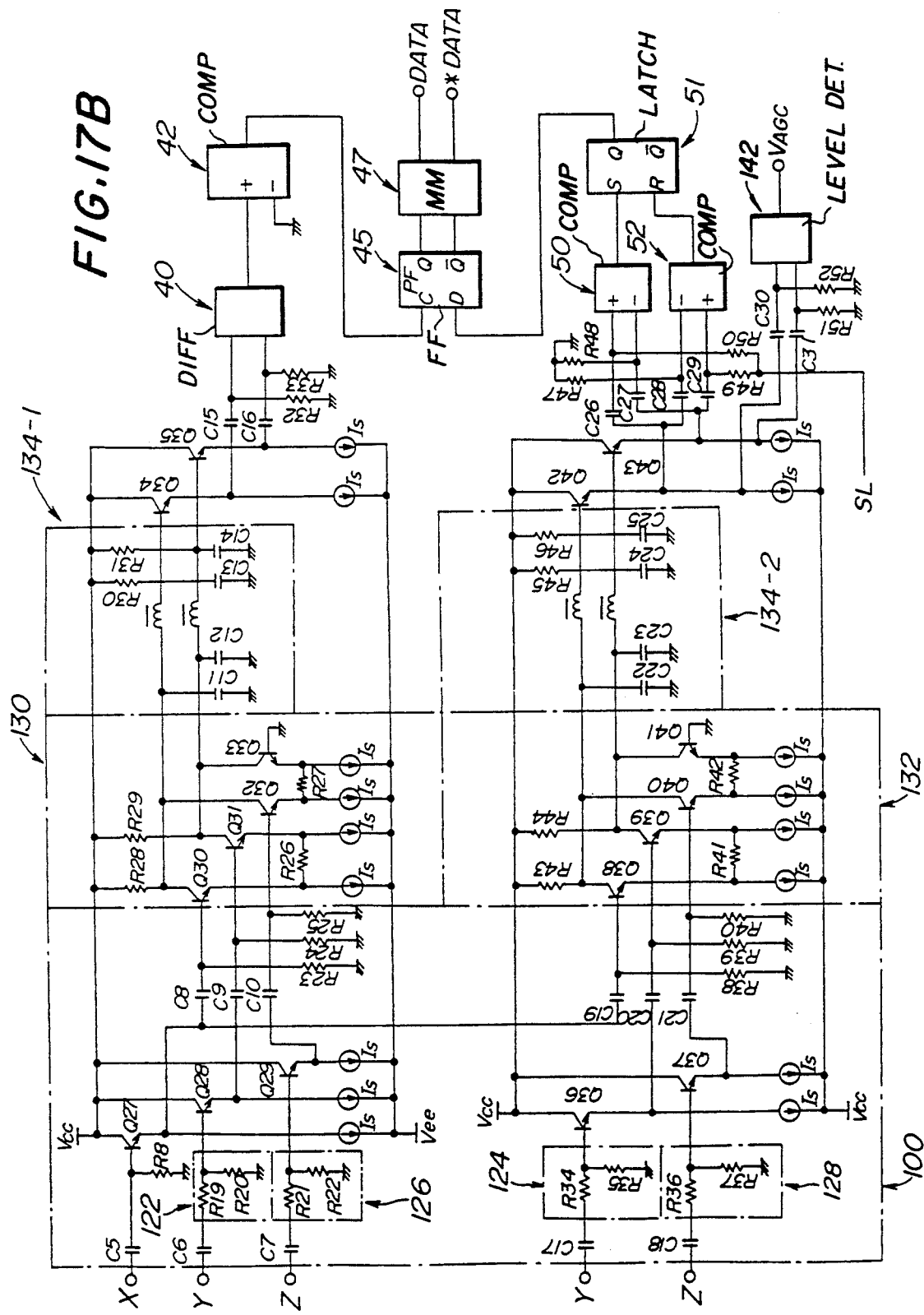

FIGS. 17A and 17B are circuit diagrams of the configuration shown in FIG. 16. The preamplifier 24 includes two transistors Q1 and Q2, resistors R1-R4 and capacitors C1 and C2. The AGC amplifier 140 includes transistors Q3-Q22, resistors R5-R12, and constant-current sources labeled Is. The output from the AGC amplifier is input to the delay circuit 112 through a transistor Q24 of the equalizing circuit 100. The equalizing circuit 100 includes transistors Q25, Q26 and Q27, which serve as the buffer amplifiers 120, 118 and 116, respectively. The attenuator 122 (FIG. 17B) is made up of two resistors R19 and R20, and the attenuator 126 is made up of two resistors R21 and R22. The outputs from the attenuators 122 and 126 are input to the adder/subtracter amplifier 130 through transistors Q28 and Q29, and the output from the delay circuit 116 (FIG. 17A) is input thereto through a transistor Q27. The attenuator 124 is made up of two resistors R34 and R35, and the attenuator 128 is made up of two resistors R36 and R37. The outputs from the attenuators 124 and 128 are input to the adder/subtracter amplifier 132 through transistors Q36 and Q37.

The adder/subtracter amplifier 130 is made up of transistors Q30-Q34 and resistors R26-R30, and the adder/subtracter amplifier 132 is made up of transistors Q38-Q41 and resistors R41-R44. The lowpass filter 134-1 is composed of resistors R30 and R31, capacitors C11-C14 and two inductors. Similarly, the lowpass filter 134-2 is composed of resistors R45 and R46, capacitors C22-C25 and two inductors.

The output from the lowpass filter 134-1 is supplied to the differentiator 40 of the peak position detecting circuit 38 through transistors Q34 and Q35. The output from the lowpass filter 134-2 is supplied to the comparators 50 and 52 through transistors Q42 and Q43, and capacitors C26 through C29. A slice level signal SL is divided into two reference voltage signals by resistors R49 and R50, which are applied to the comparators 52 and 50. The latch circuit 51 of the amplitude detecting circuit 48 is formed by an RS flip-flop.

Figure 18:
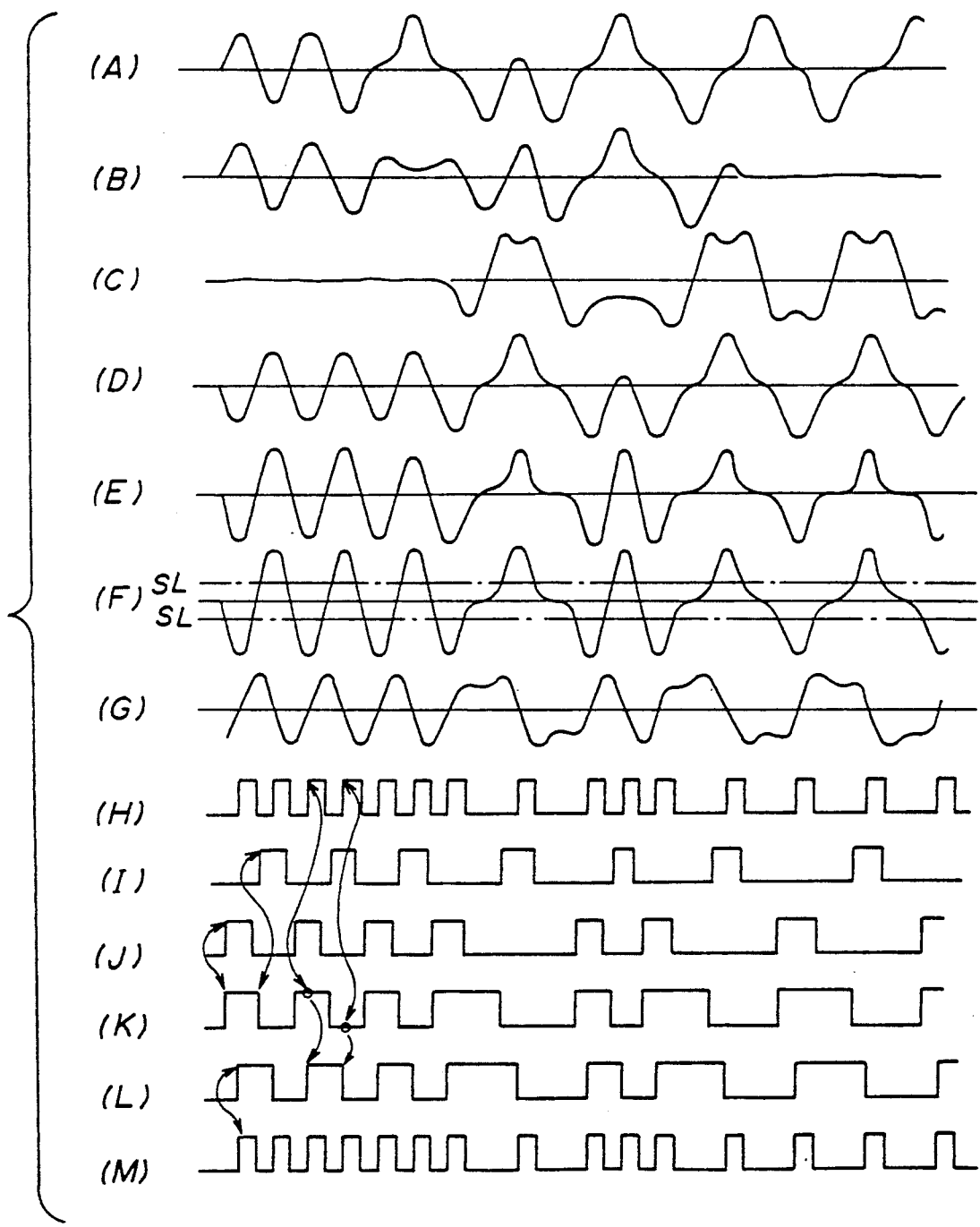
FIG. 18 is a waveform diagram of signals observed at different portions of the configuration shown in FIG. 16.

FIG. 18 is a waveform diagram of signals (A) through (M) at different portions A-M shown in FIG. 16, respectively.

The present invention is not limited to the aforementioned embodiments, and variations and modifications may be made by arbitrary combining of the first to sixth embodiments. For example, the filters shown in FIGS. 14, 15A and 15B may be applied to the configuration shown in FIG. 5 or FIG. 8. The AGC circuit 82 shown in FIG. 11 and the associated level detection circuit 86 may be omitted. The AGC circuit may be applied to the configuration shown in FIG. 5 or FIG. 8.

What is claimed is:

1. A data reproducing circuit for a memory system, comprising:
    a data sensing head for generating a reproduction signal which has negative edges having amplitude components which have a polarity opposite to that of a main signal waveform of the reproduction signal and said negative edges are located on both sides of said main signal waveform;
    first equalizing means, connected to the data sensing head, for correcting a shift of a position of a peak of the main signal waveform due to the negative edges and for generating a first signal in which said shift of the position of the peak has been corrected;
    second equalizing means for correcting a variation in an amplitude of said reproduction signal supplied from said data sensing head so that an amplitude of a maximum frequency component of said reproduction signal is approximately equal to an amplitude of a minimum frequency component thereof and for generating a second signal in which said variation of the amplitude of said reproduction signal has been corrected;
    peak position detecting means, coupled to said first equalizing means, for detecting the position of the peak of said reproduction signal from said first signal supplied from said first equalizing means;
    amplitude detecting means, coupled to said second equalizing means, for detecting the amplitude of said reproduction signal from said second signal supplied from said second equalizing means; and
    gate means, coupled to said peak position detecting circuit and said amplitude detecting means, for generating a pulsed reproduction signal from the peak position detected by said peak position detecting circuit and the amplitude detected by said amplitude detecting means.

2. A data reproducing circuit as claimed in claim 1, wherein each of said first and second equalizing means comprises:
    a first delay circuit supplied with said reproduction signal from said data sensing head and outputting a first delayed signal;
    a first attenuator supplied with said reproduction signal from said data sensing head and outputting a first attenuated signal;
    subtracting means, coupled to said first delay circuit and said first attenuator, for subtracting the first attenuated signal from said first delayed signal and outputting a first output signal;
    a second delay circuit supplied with said first output signal and outputting a second delayed signal;
    a second attenuator supplied with said first output signal; and
    adding means, coupled to said second delay circuit and said second attenuator, for adding said second attenuated signal and said second delayed signal and for outputting a corresponding one of said first and second signals.

3. A data reproducing circuit as claimed in claim 1, wherein each of said first and second equalizing means comprises:
    a first delay circuit supplied with said reproduction signal from said data sensing head and outputting a first delayed signal;
    a second delay circuit supplied with said first delayed signal and outputting a second delayed signal;
    a first attenuator supplied with said first delayed signal supplied from said first delay circuit and outputting a first attenuated signal;
    a second attenuator supplied with said reproduction signal and outputting a second attenuated signal; and
    adder/subtracter means for subtracting said first attenuated signal from said second delayed signal and for adding said second attenuated signal and the result of this subtraction to thereby output a corresponding one of said first and second signals.

4. A data reproducing circuit as claimed in claim 1, further comprising:
   level detecting means for detecting a level of said second signal supplied from said second equalizing means; and
   automatic gain control means, operatively coupled between said data sensing head and said second equalizing means, for controlling a gain of said reproduction signal from said data sensing head on the basis of the level of said second signal detected by said level detecting means.

5. A data reproducing circuit as claimed in claim 1, further comprising:
   level detecting means for detecting a level of said first signal supplied from said first equalizing means; and
   automatic gain control means, operatively coupled between said data sensing head and said first equalizing means, for controlling a gain of said reproduction signal from said data sensing head on the basis of the level of said first signal detected by said level detecting means.

6. A data reproducing circuit as claimed in claim 1, further comprising:
   first lowpass filter means for filtering a signal component of said first signal within a first predetermined frequency range; and
   second lowpass filter means for filtering a signal component of said second signal within a second predetermined frequency range.

7. A data reproducing circuit as claimed in claim 1, further comprising lowpass filter means, operatively coupled between said data sensing head and each of said first and second equalizing means, for passing a signal component of said reproduction signal within a predetermined frequency range.

8. A data reproducing circuit as claimed in claim 7, further comprising buffer amplify means, connected between said lowpass filter means and each of said first and second equalizing means, for matching an output impedance of said lowpass filter means and an output impedance of each of said first and second equalizing means.

9. A data reproducing circuit as claimed in claim 2, wherein each of said first and second equalizing means comprises a first pull-up resistor connected between a predetermined power source and an input terminal of said first delay circuit through which said reproduction signal from said data sensing head is supplied thereto, and a second pull-up resistor connected between said predetermined power source and an input terminal of said second delay circuit through which said first output signal is supplied thereto.

10. A data reproducing circuit as claimed in claim 3, wherein each of said first and second equalizing means comprises a pull-up resistor connected between a predetermined power source and an input terminal of said first delay circuit through which said reproduction signal from said data sensing head is supplied thereto.

11. A data reproducing circuit as claimed in claim 1, further comprising preamplifier means for amplifying said reproduction signal from said data sensing head.

12. A data reproducing circuit for a memory system, comprising:
   a data sensing head for generating a reproduction signal which has negative edges having amplitude components which have a polarity opposite to that of a main signal waveform of the reproduction signal and said negative edges ar located on both sides of the main signal waveform;
   equalizing means, connected to the data sensing head, for correcting a shift of a position of a peak of the main signal waveform due to the negative edges and for generating a first signal in which said shift of the position of the peak has been corrected and for correcting a variation in an amplitude of said reproduction signal supplied form said data sensing head so that an amplitude of a maximum frequency component of said reproduction signal is approximately equal to an amplitude of a minimum frequency component thereof and for generating a second signal in which said variation of the amplitude of said reproduction signal has been corrected;
   peak position detecting means, coupled to said equalizing means, for detecting the position of the peak of said reproduction signal from said first signal supplied from said equalizing means;
   amplitude detecting means, coupled to said equalizing means, for detecting the amplitude of said reproduction signal from said second signal supplied from said equalizing means; and
   gate means, coupled to said peak position detecting circuit and said amplitude detecting means, for generating a pulsed reproduction signal from the peak position detected by said peak position detecting circuit and the amplitude detected by said amplitude detecting means.

13. A data reproducing circuit as claimed in claim 12, wherein said equalizing circuit comprises:
   a first delay circuit supplied with said reproduction signal from said data sensing head and for outputting a first delayed signal;
   a second delay circuit supplied with said reproduction signal from said first delayed signal and for outputting a second delayed signal;
   a first buffer circuit buffering said second delayed signal and outputting a first buffered signal;
   a second buffer circuit buffering said first delayed signal and outputting a second buffered signal;
   a third buffer circuit buffering said reproduction signal and outputting a third buffered signal;
   a first attenuator coupled to said second buffer circuit and outputting a first attenuated signal;
   a second attenuator coupled to said second buffer circuit and outputting a second attenuated signal;
   a third attenuator coupled to said third buffer circuit and outputting a third attenuated signal;
   a fourth attenuator coupled to said third buffer circuit and outputting a fourth attenuated signal;
   first adder/subtracter means for subtracting said first attenuated signal from said first buffered signal and for adding said third attenuated signal and the result of this subtraction to thereby generate said first signal to be supplied to said peak position detecting means; and
   second adder/subtracter means for subtracting said second attenuated signal from said first buffered signal and for adding said fourth attenuated signal and the result of this subtraction to thereby generate said second signal to be supplied to said amplitude detecting means.

14. A data reproducing circuit as claimed in claim 12, further comprising:
  level detecting means for detecting a level of said second signal supplied from said equalizing means; and
  automatic gain control means, coupled between said data sensing head and said equalizing means, for controlling a gain of said reproduction signal from said data sensing head on the basis of the level of said second signal detected by said level detecting means.

15. A data reproducing circuit as claimed in claim 12, further comprising:
  first lowpass filter means for filtering a signal component of said first signal within a first predetermined frequency range; and
  second lowpass filter means for filtering a signal component of said second signal within a second predetermined frequency range.

16. A data reproducing circuit as claimed in claim 12, further comprising lowpass filter means, operatively coupled between said data sensing head and said equalizing means, for passing a signal component of said reproduction signal within a predetermined frequency range.

17. A data reproducing circuit as claimed in claim 16, further comprising buffer amplify means, connected between said lowpass filter means and said equalizing means, for matching an output impedance of said lowpass filter means and an output impedance of said equalizing means.

18. A data reproducing circuit as claimed in claim 12, wherein said equalizing means comprises a pull-up resistor connected between a predetermined power source and an input terminal of said first delay circuit through which said reproduction signal from said data sensing head is supplied thereto.

19. A data reproducing circuit as claimed in claim 12, further comprising preamplifier means for amplifying said reproduction signal from said data sensing head.

* * * * *